(12) United States Patent
Arik et al.

(10) Patent No.: US 11,705,107 B2
(45) Date of Patent: Jul. 18, 2023

(54) REAL-TIME NEURAL TEXT-TO-SPEECH

(71) Applicant: Baidu USA, LLC, Sunnyvale, CA (US)

(72) Inventors: Sercan O. Arik, San Francisco, CA (US); Mike Chrzanowski, Palo Alto, CA (US); Adam Coates, Mountain View, CA (US); Gregory Diamos, San Jose, CA (US); Andrew Gibiansky, Mountain View, CA (US); John Miller, Palo Alto, CA (US); Andrew Ng, Mountain View, CA (US); Jonathan Raiman, Palo Alto, CA (US); Shubhabrata Sengupta, Menlo Park, CA (US); Mohammad Shoeybi, Los Altos, CA (US)

(73) Assignee: Baidu USA LLC, Sunnyvale, CA (US)

( * ) Notice: Subject to any disclaimer, the term of this patent is extended or adjusted under 35 U.S.C. 154(b) by 0 days.

(21) Appl. No.: 17/061,433

(22) Filed: Oct. 1, 2020

(65) Prior Publication Data
US 2021/0027762 A1     Jan. 28, 2021

Related U.S. Application Data

(63) Continuation of application No. 15/882,926, filed on Jan. 29, 2018, now Pat. No. 10,872,598.
(Continued)

(51) Int. Cl.
*G10L 13/08* (2013.01)
*G10L 13/027* (2013.01)
(Continued)

(52) U.S. Cl.
CPC ............. *G10L 13/08* (2013.01); *G06N 3/044* (2023.01); *G06N 3/045* (2023.01); *G06N 3/082* (2013.01);
(Continued)

(58) Field of Classification Search
None
See application file for complete search history.

(56) References Cited

U.S. PATENT DOCUMENTS 5,970,453 A * 10/1999 Sharman ............... G10L 13/07
704/258
6,078,885 A     6/2000 Beutnagel
(Continued)

OTHER PUBLICATIONS

Gehring,"Convolutional sequence to sequence learing," In ICML, 2017. (10 pgs).
(Continued)

*Primary Examiner* — Jakieda R Jackson
(74) *Attorney, Agent, or Firm* — North Weber & Baugh LLP

(57) ABSTRACT

Embodiments of a production-quality text-to-speech (TTS) system constructed from deep neural networks are described. System embodiments comprise five major building blocks: a segmentation model for locating phoneme boundaries, a grapheme-to-phoneme conversion model, a phoneme duration prediction model, a fundamental frequency prediction model, and an audio synthesis model. For embodiments of the segmentation model, phoneme boundary detection was performed with deep neural networks using Connectionist Temporal Classification (CTC) loss. For embodiments of the audio synthesis model, a variant of WaveNet was created that requires fewer parameters and trains faster than the original. By using a neural network for each component, system embodiments are simpler and more flexible than traditional TTS systems, where each component requires laborious feature engineering and extensive domain expertise. Inference with system embodiments may be performed faster than real time.

20 Claims, 10 Drawing Sheets

Related U.S. Application Data

(60) Provisional application No. 62/463,482, filed on Feb. 24, 2017.

(51) Int. Cl.
  G10L 25/30 (2013.01)
  G06N 3/082 (2023.01)
  G06N 3/044 (2023.01)
  G06N 3/045 (2023.01)
  G06N 3/02 (2006.01)
  G06F 40/242 (2020.01)
  G06N 3/047 (2023.01)

(52) U.S. Cl.
  CPC .......... G10L 13/027 (2013.01); G10L 25/30 (2013.01); *G06F 40/242* (2020.01); *G06N 3/02* (2013.01); *G06N 3/047* (2023.01)

(56) References Cited

U.S. PATENT DOCUMENTS

| | | | |
|---|---|---|---|
| 6,366,884 B1* | 4/2002 | Bellegarda | G10L 13/10 704/266 |
| 7,412,393 B1* | 8/2008 | De Fabbrizio | G06F 3/167 704/231 |
| 8,160,877 B1* | 4/2012 | Nucci | G10L 17/06 704/246 |
| 8,527,276 B1* | 9/2013 | Senior | G06N 3/084 704/258 |
| 8,898,062 B2 | 11/2014 | Kato | |
| 9,508,341 B1 | 11/2016 | Parlikar | |
| 10,134,388 B1 | 11/2018 | Lilly | |
| 10,255,905 B2* | 4/2019 | Chua | G10L 13/047 |
| 10,319,364 B2 | 6/2019 | Reber | |
| 11,062,615 B1 | 7/2021 | Speciner | |
| 2001/0012999 A1 | 8/2001 | Vitale | |
| 2002/0026315 A1 | 2/2002 | Miranda | |
| 2003/0212555 A1 | 11/2003 | van Santen | |
| 2004/0039570 A1 | 2/2004 | Harengel | |
| 2004/0193398 A1 | 9/2004 | Chu | |
| 2004/0196964 A1* | 10/2004 | Bluvband | H04M 1/645 379/88.13 |
| 2005/0033575 A1 | 2/2005 | Schneider | |
| 2005/0119890 A1 | 6/2005 | Hirose | |
| 2005/0137870 A1 | 6/2005 | Mizutani | |
| 2005/0182629 A1 | 8/2005 | Coorman | |
| 2005/0192807 A1 | 9/2005 | Emam | |
| 2006/0069566 A1* | 3/2006 | Fukada | G10L 13/06 704/260 |
| 2006/0149543 A1 | 7/2006 | Lassalle | |
| 2006/0200344 A1* | 9/2006 | Kosek | G10L 21/0208 704/226 |
| 2006/0271367 A1 | 11/2006 | Hirabayashi | |
| 2007/0005337 A1 | 1/2007 | Mount | |
| 2007/0094030 A1 | 4/2007 | Xu | |
| 2007/0118377 A1 | 5/2007 | Badino | |
| 2007/0150271 A1* | 6/2007 | Virette | G10L 19/18 704/230 |
| 2007/0168189 A1 | 7/2007 | Tamura | |
| 2007/0233494 A1* | 10/2007 | Shen | G10H 1/0091 704/260 |
| 2007/0271099 A1* | 11/2007 | Kagoshima | G10L 13/02 704/201 |
| 2008/0114598 A1 | 5/2008 | Prieto | |
| 2008/0167862 A1* | 7/2008 | Mohajer | G10L 25/90 704/207 |
| 2009/0157383 A1 | 6/2009 | Cho | |
| 2010/0004934 A1 | 1/2010 | Hirose | |
| 2010/0312562 A1 | 12/2010 | Wang | |
| 2011/0087488 A1 | 4/2011 | Morinaka | |
| 2011/0202355 A1 | 8/2011 | Grill | |
| 2012/0035933 A1 | 2/2012 | Con Kie | |
| 2012/0143611 A1* | 6/2012 | Qian | G10L 13/07 704/260 |
| 2012/0203557 A1* | 8/2012 | Odinak | G01C 21/3608 704/270.1 |
| 2012/0265533 A1 | 10/2012 | Honeycutt | |
| 2013/0132085 A1* | 5/2013 | Mysore | G10H 1/0008 704/256.1 |
| 2013/0262096 A1* | 10/2013 | Wilhelms-Tricarico | G10L 13/04 704/202 |
| 2013/0325477 A1* | 12/2013 | Mitsui | G10L 13/10 704/258 |
| 2014/0046662 A1 | 2/2014 | Tyagi | |
| 2014/0236597 A1* | 8/2014 | Ben Ezra | G10L 13/07 704/235 |
| 2015/0186359 A1* | 7/2015 | Fructuoso | G10L 25/30 704/8 |
| 2015/0199956 A1* | 7/2015 | Tan | G10L 13/08 704/260 |
| 2015/0243275 A1* | 8/2015 | Luan | G06F 3/0482 704/260 |
| 2015/0279358 A1 | 10/2015 | Kingsbury | |
| 2016/0012035 A1* | 1/2016 | Tachibana | G10L 13/00 704/10 |
| 2016/0078859 A1 | 3/2016 | Luan | |
| 2016/0140951 A1* | 5/2016 | Agiomyrgiannakis | G10L 13/02 704/260 |
| 2016/0343366 A1* | 11/2016 | Fructuoso | G10L 13/08 |
| 2016/0365085 A1* | 12/2016 | Raghavendra | G10L 13/08 |
| 2017/0053642 A1* | 2/2017 | Yamamoto | G10L 13/033 |
| 2017/0148433 A1 | 5/2017 | Catanzaro | |
| 2017/0162186 A1* | 6/2017 | Tamura | G10L 13/047 |
| 2017/0308789 A1* | 10/2017 | Langford | G06N 3/084 |
| 2019/0122651 A1 | 4/2019 | Arik et al. | |

OTHER PUBLICATIONS

Ping et al.,"ClariNet: ParallelWave Generation in End-to-End Text-to-Speech," arXiv preprint arXiv:1807.07281, 2018. (12 pgs).

Arik et al.,"Deep Voice: Real-time neural text-to-speech," In ICML, 2017. (17pgs).

Arik et al.,"Deep Voice 2: Multi-speaker neural text-to-speech," In NIPS, 2017. (15 pgs).

Bahdanau et al.,"Neural machine translation by jointly learning to align and translate," In ICLR, 2015. (15 pgs).

Bucilua et al.,"Model Compression," In ACM SIGKDD, 2006. (7 pgs).

Chung et al.,"A recurrent latent variable model for sequential data," In NIPS, 2015. (9pgs).

Dinh et al.,"NICE: Non-linear independent components estimation," arXiv preprint arXiv:1410.8516, 2015. (13 pgs).

Dinh et al.,"Density estimation using Real NVP," In ICLR, 2017. (32pgs).

Griffin et al.,"Signal estimation from modified short-time Fourier transform," IEEE Transactions on Acoustics, Speech, and Signal Processing, 1984. (8pgs).

Gu et al.,"Non-autoregressive neural machine translation," In ICLR, 2018. (13 pgs).

Hinton et al.,"Distilling the knowledge in a neural network," arXiv preprint arXiv:1503.02531, 2015. (9 pgs).

Abadi et al.,"TensorFlow: Large-scale machine learning on heterogeneous systems," Retrieved from Internet <URL: http://download.tensorflow.org/paper/whitepaper2015.pdf>, 2015. (19pgs).

Amodei et al.,"Deep speech 2: End-to-End speech recognition in English and Mandarin," arXiv preprint arXiv:1512.02595, 2015. (28pgs).

Boersma et al.,"PRAAT, a system for doing phonetics by computer," Glot international, vol. 5, No. 9/10, Nov./Dec. 2001 (341-347). (7pgs).

Bradbury et al.,"Quasi-recurrent neural networks," arXiv preprint arXiv:1611.01576, 2016. (11pgs).

Chung et al.,"Empirical evaluation of gated recurrent neural networks on sequence modeling," arXiv preprint arXiv:1412.3555, 2014. (9 pgs).

(56) References Cited

OTHER PUBLICATIONS

Diamos et al., "Persistent RNNS: Stashing recurrent weights On-Chip," In Proceedings of The 33rd International Conference on Machine Learning, 2016. (10pgs).
Dukhan et al., "PeachPy meets Opcodes: direct machine code generation from Python," In Proceedings of the 5th Workshop on Python for High-Performance and Scientific Computing, 2015. (2 pgs).
Graves et al., "Connectionist temporal classification:Labelling unsegmented sequence data with recurrent neural networks," In Proc of the 23rd Int'l Con on Machine Learning, 2006. (8 pgs).
Kingma et al., "Adam: A method for stochastic optimization," arXiv preprint arXiv:1412.6980, 2014. (9 pgs).
Mehri et al., "SampleRNN: An unconditional end-to-end neural audio generation model," arXiv preprint arXiv:1612.07837, 2016. (11pgs).
Morise et al., "WORLD: a vocoder-based high-quality speech synthesis system for real-time applications," IEICE Transactions on Information and Systems, 2016. (8 pgs).
Oord et al., "Pixel recurrent neural networks," arXiv preprint arXiv:1601.06759, 2016. (10 pgs).
Paine et al., "Fast wavenet generation algorithm," arXiv preprint arXiv:1611.09482, 2016. (6 pgs).
Pascual et al., "Multi-output RNN-LSTM for multiple speaker speech synthesis with interpolation model," 9th ISCA Speech Synthesis Workshop, 2016. (6 pgs).
Prahallad et al., "The blizzard challenge 2013-Indian language task," Retrieved from Internet <URL: <http://fesvox.org/blizzard/bc2013/blizzard_2013_summary_indian.pdf>, 2013. (11pgs).
Rao et al., "Grapheme-to-phoneme conversion using long short-term memory recurrent neural networks," In Acoustics, Speech and Signal Processing (ICASSP), 2015 IEEE International Conference, 2015.(5 pgs).
Ribeiro et al., "Crowdmos: An approach for crowdsourcing mean opinion score studies," In Acoustics, Speech & Signal Processing (ICASSP) IEEE Intr Conference, 2011. (4 pgs).
Ronanki et al., "A template-based approach for speech synthesis intonation generation using LSTMs," Interspeech 2016, pp. 2463-2467, 2016. (5pgs).
Sotelo et al., "Char2wav: End-to-End speech synthesis," Retrieved from Internet <URL:<https://openreview.net/pdf?id=B1VWyySKx>, 2017. (6pgs).
Stephenson et al., "Production Rendering, Design and Implementation," Springer, 2005. (5pgs).
Taylor et al., "Text-to-Speech Synthesis," Cambridge University Press, New York, NY, USA, 1st edition, 2009. ISBN 0521899273, 9780521899277. (17 pgs).
Theis et al., "A note on the evaluation of generative models," arXiv preprint arXiv:1511.01844, 2015. (9 pgs).
Oord et al., "Wavenet: A generative model for raw audio," arXiv preprint arXiv:1609.03499, 2016. (15 pgs).
Weide et al., "The CMU pronunciation dictionary," Retrieved from Internet <URL: <http://www.speech.cs.cmu.edu/cgi-bin/cmudict>, 2008. (2pgs).
Yao et al., "Sequence-to-sequence neural net models for grapheme-to-phoneme conversion," arXiv preprint arXiv:1506.00196, 2015. (5 pgs).
Ribeiro et al., "CrowdMOS: An approach for crowdsourcing mean opinion score studies," In ICASSP, 2011. (4pgs).
Shen et al., "Natural TTS synthesis by conditioning WaveNet on mel spectrogram predictions," In ICASSP, 2018. (5pgs).
Sotelo et al., "Char2wav:End-to-end speech synthesis," ICLR workshop, 2017. (6pgs).
Taigman et al., "VoiceLoop: Voice fitting and synthesis via a phonological loop," In ICLR, 2018. (14pgs).
P. Taylor"Text-to-Speech Synthesis," Cambridge University Press, 2009. (17pgs).
Van den Oord et al., "WaveNet: A generative model for raw audio," arXiv preprint arXiv:1609.03499, 2016. (15pgs).

Van den Oord et al., "Neural discrete representation learning," arXiv preprint arXiv:1711.00937, 2018. (11pgs).
Van den Oord et al., "Parallel WaveNet: Fast high-fidelity speech synthesis," arXiv preprint arXiv:1711.10433, 2017. (11pgs).
Wang et al., "Neural source-filter-based waveform model for statistical parametric speech synthesis," arXiv preprint arXiv:1904.12088, 2019. (14pgs).
Wang et al., "Tacotron: Towards end-to-end speech synthesis," arXiv preprint arXiv:1703.10135, 2017. (10pgs).
Ping et al., "Deep Voice 3: Scaling text-to-speech with convolutional sequence learning," arXiv preprint arXiv:1710.07654, 2018. (16pgs).
Peng et al., "Parallel Neural Text-to-Speech," arXiv preprint arXiv:1905.08459, 2019. (14pgs).
Odena et al., "Deconvolution and checkerboard artifacts," 2016, [Retrieved Sep. 3, 2019]. Retrieved from Internet <URL:<https://distill.pub/2016/deconv-checkerboard/>.(10pgs).
Pascanu et al., "On the difficulty of training recurrent neural networks," In ICML, 2013. (9pgs).
Ping et al., "Deep Voice 3: Scaling text-to-speech with convolutional sequence learning," In ICLR, 2018. (16pgs).
Rezende et al., "Variational inference with normalizing flows," In ICML, 2015. (10 pgs).
Roy et al, "Theory and experiments on vector quantized autoencoders," arXiv preprint arXiv:1805.11063, 2018. (11pgs).
Salimans et al., "PixelCNN++: Improving the PixelCNN with discretized logistic mixture likelihood and other modifications," In ICLR, 2017. (10pgs).
Zen et al, "Unidirectional long short-term memory recurrent neural network with recurrent output layer for low-latency speech synthesis," Retrieved from Internet <URL: <https://static.googleusercontent.com/media/research.google.com/en//pubs/archive/43266.pdf>, 2015. (5pgs).
Zen et al., "Statistical parametric speech synthesis using deep neural networks," Retrieved from Internet <URL: <https://static.googleusercontent.com/media/research.google.com/en//pubs/archive/40837.pdf>, 2013. (5pgs).
Y. Agiomyrgiannakis, "Vocaine the vocoder and applications in speech synthesis," In ICASSP, 2015. (5 pgs).
Arik et al., "Deep Voice: Real-time neural text-to-speech," arXiv preprint arXiv:1702.07825v2, 2017. (17 pgs).
Arik et al., "Deep Voice 2: Multi-speaker neural text-to-speech," arXiv preprint arXiv:1705.08947v1, 2017. (15 pgs).
C. Bagwell, "SoX—Sound exchange," [online], [Retrieved Jul. 22, 2019]. Retrieved from Internet <URL:https://sourceforge.net/p/sox/code/ci/master/tree/> (3 pgs).
Bahdanau et al., "Neural machine translation by jointly learning to align and translate," arXiv preprint arXiv:1409.0473v1, 2014. (15pgs).
Capes et al., "Siri On-Device Deep Learning-Guided Unit Selection Text-to-Speech System," In Interspeech, 2017. (5pgs).
Cho et al., "Learning phrase representations using RNN encoder-decoder for statistical machine translation," In EMNLP, 2014. (11pgs).
Chorowski et al., "Attention-based models for speech recognition," In NIPS, 2015. (9pgs).
Dauphin et al., "Language modeling with gated convolutional networks," arXiv preprint arXiv:1612.08083v1, 2016. (8pgs).
Gehring et al., "Convolutional sequence to sequence learning," arXiv preprint arXiv:1705.03122v1, 2017. (15 pgs).
U.S. Appl. No. 15/822,926 U.S. Pat. No. 10,872,598, Sercan Arik, Systems and Methods for Real-Time Neural Text-To-Speech, filed Jan. 29, 2018 Dec. 22, 2020.
U.S. Appl. No. 16/654,955, Kainan Peng, Parallel Neural Text-To-Speech, filed Oct. 16, 2019.
Notice of Allowance and Fee(s) Due, dated Jan. 22, 2021, in related U.S. Appl. No. 16/654,955. (10 pgs).
Kingma et al., "Glow: Generative flow with invertible 1×1 convolutions," arXiv preprint arXiv:1807.03039, 2018. (15pgs).
Kingma et al., "Auto-encoding variational Bayes," arXiv preprint arXiv:1312.6114, 2014. (14pgs).
Kingma et al., "Improving variational inference with inverse autoregressive flow," In NIPS, 2016. (16pgs).

(56) References Cited

OTHER PUBLICATIONS

Lee et al.,"Deterministic non-autoregressive neural sequence modeling by iterative refinemen," arXiv preprint arXiv:1802.06901, 2018. (11pgs).
Nachmani et al.,"Fitting new speakers based on a short untranscribed sample," arXiv preprint arXiv:1802.06984, 2018. (9pgs).
Ping et al.,"ClariNet: Parallel wave generation in end-to-end text-to-speech," arXiv preprint arXiv:1807.07281, 2019. (15pgs).
Prenger et al.,"WaveGlow: A flow-based generative network for speech synthesis," [online], [Retrieved Mar. 3, 2020]. Retrieved from Internet <URL: https://ieeexplore.ieee.org/abstract/document/8683143>In ICASSP, 2019. (2pgs).
Rezende et al.,"Variational inference with normalizing flows," arXiv preprint arXiv:1505.05770, 2016. (10pgs).
Rezende et al.,"Stochastic backpropagation and approximate inference in deep generative models," arXiv preprint arXiv:1401.4082, 2014. (14pgs).
Kaiser et al.,"Fast decoding in sequence models using discrete latent variables," arXiv preprint arXiv:1803.03382, 2018. (10pgs).
Kim et al.,"Sequence-level knowledge distillation," In EMNLP, 2016. (11pgs).
Kingma et al.,"ADAM: A method for stochastic optimization," In ICLR, 2015. (15 pgs).
Kingma et al.,"Auto-Encoding variational Bayes," In ICLR, 2014. (14 pgs).
Kingma et al.,"Improving variational inference with inverse autoregressive flow," In NIPS, 2016. (9 pgs).
Lee et al.,"Deterministic non-autoregressive neural sequence modeling by iterative refinement," arXiv preprint arXiv:1802.06901, 2018. (11 pgs).
Mehri et al.,"SampleRNN:An unconditional end-to-end neural audio generation model," In ICLR, 2017. (11pgs).
Morise et al.,"WORLD: a vocoder-based high-quality speech synthesis system for real-time applications," IEICE Transactions on Information & Systems, 2016. (8 pgs).
K. Murphy,"Machine learning, A probabilistic perspective," 2012, [online], [Retrieved Sep. 3, 2019]. Retrieved from Internet <URL: <https://doc.lagout.org/science/Artificial%20Intelligence/Machine%20learning/Machine%20Learning_%20A%20Probabilistic%20Perspective%20%5BMuprhy%202012-08-24%5D.pdf> (24 pgs).
Gonzalvo et al.,"Recent advances in Google real-time HMM-driven unit selection synthesizer," In Interspeech, 2016. (5 pgs).
Kawahara et al.,"Restructuring speech representations using a pitch-adaptive time-Frequency smoothing and an instantaneous-frequency-based F0 extraction: Possible role of a repetitive structure in sounds," Speech communication, 1999. (21pgs).
Ochshorn et al., "Gentle," Retrieved from Internet <URL: https://github.com/lowerquality/gentle> 2017. (2 pgs).
Van den Oord et al.,"WaveNet: A generative model for raw audio," arXiv:1609.03499, 2016. (15 pgs).
Panayotov et al.,"Librispeech: an ASR corpus based on public domain audio books," In Acoustics, Speech and Signal Processing (ICASSP), 2015 IEEE. (5 pgs).
Raffel et al.,"Online and linear-time attention by enforcing monotonic alignments," arXiv:1704.00784v1, 2017. (19 pgs).
Abdel-Hamid et al.,"Fast speaker adaptation of hybrid NN/HMM model for speech recognition based on discriminative learning of speaker code," In ICASSP, 2013. (5pgs).
Arik et al.,"Deep Voice: Real-time neural text-to-speech," arXiv preprint arXiv:1702.07825, 2017. (17 pgs).
Bradbury et al.,"Quasi-Recurrent Neural Networks," In ICLR, 2017. (12pgs).
Cho et al.,"Learning Phrase Representations using RNN Encoder-Decoder for statistical machine translation," arXiv:1406.1078, 2014. (14 pgs).
Fan et al.,"Multi-speaker modeling and speaker adaptation for DNN-based TTS synthesis," In IEEE ICASSP, 2015. (2 pgs).

Graves et al.,"Connectionist temporal classification: labelling unsegmented sequence data with recurrent neural networks," In Proceedings of the 23rd International Conference on Machine Learning (ICML), 2006. (8 pgs).
Hsu et al.,"Voice conversion from unaligned corpora using variational autoencoding wasserstein generative adversarial networks," arXiv:1704.00849, 2017. (5 pgs).
Ioffe et al.,"Batch normalization: Accelerating deep network training by reducing internal covariate shift," arXiv preprint arXiv:1502.03167, 2015. (10 pgs).
Lample et al.,"Neural architectures for named entity recognition," arXiv preprint arXiv:1603.01360, 2016. (10 pgs).
Li et al.,"Deep speaker: an End-to-End neural speaker embedding system," arXiv preprint arXiv:1705.02304, 2017. (8 pgs).
Reynolds et al.,"Speaker verification using adapted gaussian mixture models," Digital signal processing, 10(1-3):19-41, 2000. (23 pgs).
Ribeiro et al.,"Crowdmos: An approach for crowdsourcing mean opinion score studies," In IEEE ICASSP, 2011. (4 pgs).
Ronanki et al.,"Median-based generation of synthetic speech durations using a non-parametric approach," arXiv preprint arXiv:1608.06134, 2016. (7 pgs).
Salimans et al.,"Improved techniques for training GANs," In NIPS, 2016. (9 pgs).
Sotelo et al.,"CHAR2WAV: End-to-End speech synthesis," In ICLR2017 workshop submission, 2017. (6pgs).
Wang et al.,"Tacotron: Towards end-to-end speech synthesis," In Interspeech, 2017. (3 pgs).
Wu et al.,"A study of speaker adaptation for DNN-based speech synthesis," In Interspeech, 2015. (5 pgs).
Yamagishi et al.,"Robust speaker-adaptive HMM-based text-to-speech synthesis," IEEE Transactions on Audio, Speech, and Language Processing, 2009. (23 pgs).
Yang et al.,"On the training of DNN-based average voice model for speech synthesis," In Signal & Info. Processing Association Annual Summit & Conference (APSIPA), Retrieved from Internet <URL: <http://www.nwpu-aslp.org/lxie/papers/2016APSIPA-YS.pdf>, 2016. (6 pgs).
Zen et al.,"Unidirectional long short-term memory recurrent neural network with recurrent output layer for low-latency speech synthesis," In IEEE ICASSP, 2015. (5 pgs).
Zen et al.,"Fast, Compact, and High quality LSTM-RNN based statistical parametric speech synthesizers for mobile devices," arXiv:606.06061, 2016. (14 pgs).
Gehring et al.,"Convolutional sequence to sequence learning," In ICML, 2017. (15pgs).
Hsu et al.,"Hierarchical generative modeling for controllable speech synthesis," In ICLR, 2019. (27pgs).
Jia et al.,"Transfer learning from speaker verification to multispeaker text-to-speech synthesis," arXiv preprint arXiv:1806.04558, 2019. (15pgs).
Kalchbrenner et al.,"Efficient neural audio synthesis," arXiv preprint arXiv:1802.08435, 2018. (10pgs).
Kim et al.,"FloWaveNet: A generative flow for raw audio," arXiv preprint arXiv:1811.02155, 2019. (9pgs).
Arik et al.,"Deep Voice: Real-time neural text-to-speech," arXiv preprint arXiv:arXiv:1702.07825,2017. (17pgs).
Arik et al.,"Deep Voice 2: Multi-speaker neural text-to-speech," arXiv preprint arXiv:1705.08947, 2017. (15pgs).
Arik et al.,"Neural voice cloning with a few samples," arXiv preprint arXiv:1802.06006, 2018. (18pgs).
Arik et al.,"Fast spectrogram inversion using multi-head convolutional neural networks," arXiv preprint arXiv:1808.06719, 2018. (6pgs).
Bahdanau et al.,"Neural machine translation by jointly learning to align and translate," arXiv preprint arXiv:1409.0473, 2016. (15 pgs).
Bengio et al.,"Scheduled sampling for sequence prediction with recurrent neural networks," arXiv preprint arXiv:1506.03099, 2015. (9pgs).
Bowman et al.,"Generating sentences from a continuous space," In Proceedings of The 20th SIGNLL Conference on Computational Natural Language Learning, 2016. (12pgs).

(56) References Cited

OTHER PUBLICATIONS

Chen et al.,"Sample efficient adaptive text-to-speech," arXiv preprint arXiv:1809.10460, 2019. (16pgs).
Chung et al.,"A recurrent latent variable model for sequential data," arXiv preprint arXiv:1506.02216, 2016. (9pgs).
Denton et al.,"Stochastic video generation with a learned prior,"arXiv preprint arXiv:1802.07687, 2018. (12pgs).
Yamagishi et al., "Robust Speaker-Adaptive HMM-Based Text-to-Speech Synthesis," In IEEE Transactions on Audio, and Language Processing, 2009. (23pgs).
Yamagishi et al., "Thousands of Voices for HMM-Based Speech Synthesis-Analysis and Application of TTS Systems Built on Various ASR Corpora", In IEEE Transactions on Audio, Speech, and Language Processing, 2010. (21 pgs).
Yamagishi et al.,"Robust Speaker-Adaptive HMM-Based Text-to-Speech Synthesis," IEEE Transactions on Audio, Speech, and Language Processing, vol. 17, No. 6, Aug. 2009, [online], [Retrieved Jul. 8, 2018]. Retrieved from Internet <URL: <https://www.researchgate.net/publication/224558048> (24 pgs).
Rush et al.,"A neural attention model for abstractive sentence summarization," In EMNLP, 2015. (11 pgs).
Salimans et al.,"Weight normalization: A simple reparameterization to accelerate training of deep neural networks," In NIPS, arXiv:1602.07868v3, 2016. (11 pgs).
Sotelo et al.,"Char2wav: End-to-end speech synthesis," In ICLR workshop, 2017. (6 pgs).
Sutskever et al., "Sequence to Sequence Learning with Neural Networks", In NIPS, 2014. (9 pgs).
Taigman et al., "Voiceloop: Voicefitting Andsynthesis Via Aphonologicalloop", arXiv preprint arXiv:1707.06588, 2017. (12pgs).
Paul Taylor,"Text-to-Speech Synthesis," [online], [Retrieved Aug. 1, 2019]. Retrieved from Internet <URL: <http://citeseerx.ist.psu.edu/viewdoc/download?doi=10.1.1.118.5905&rep=rep1&type=pdf> Cambridge University Press, 2009 (22 pgs).
Vaswani et al., "Attention Is All You Need", arXiv preprint arXiv:1706.03762, 2017.(15 pgs).
Corrected Notice of Allowance and Fee Due dated Oct. 6, 2020, in related U.S. Appl. No. 15/974,397. (4 pgs).
Notice of Allowance and Fee Due dated Oct. 2, 2020, in related U.S. Appl. No. 15/974,397. (10 pgs).
U.S. Appl. No. 17/061,433, Sercan Arik, Real-Time Neural Text-To-Speech, Pending.
U.S. Appl. No. 17/087,524, Sercan Arik, Multi-Speaker Neural Text-To-Speech, Pending.
U.S. Appl. No. 17/129,752, Wei Ping, Waveform Generation Using End-To-End Text-To-Waveform System, Pending.
Notice of Allowance and Fee(s) Due, dated Feb. 24, 2022, in related U.S. Appl. No. 17/129,752. (11 pgs).
Aaron et al.,"Parallel WaveNet: Fast High-Fidelity Speech Synthesis," arXiv preprint arXiv:1711.10433, 2017. (11pgs).
Zhao et al., "Wasserstein GAN and Waveform Loss-based Acoustic Model Training for Multi-speaker Text-to-Speech Synthesis Systems Using a Wave Net Vocoder," arXiv preprint arXiv: 1807.11679, 2018. (10pgs).
Non-Final Office Action dated Jul. 11, 2022, in U.S. Appl. No. 17/087,524 (14 pgs).
Amendment filed May 3, 2022, in related U.S. Appl. No. 17/129,752. (7 pgs).
Notice of Allowance and Fee(s) Due, dated May 17, 2022, in related U.S. Appl. No. 17/129,752. (12 pgs).
Corrected Notice of Allowability, dated Jul. 20, 2022, in related U.S. Appl. No. 17/129,752. (4 pgs).
Corrected Notice of Allowability, dated Aug. 22, 2022, in related U.S. Appl. No. 17/129,752. (6 pgs).
Corrected Notice of Allowability, dated Sep. 23, 2022, in related U.S. Appl. No. 17/129,752. (6 pgs).
Notice of Allowance and Fee Due dated Nov. 9, 2022, in related U.S. Appl. No. 17/087,524. (8 pgs).
U.S. Appl. No. 15/882,926 U.S. Pat. No. 10,872,598, Sercan Arik, Systems and Methods for Real-Time Neural Text-To-Speech, filed Jan. 29, 2018 Dec. 22, 2020.
U.S. Appl. No. 17/061,433, Sercan Arik, Real-Time Neural Text-To-Speech, filed Oct. 1, 2020 Pending.
U.S. Appl. No. 15/974,397 U.S. Pat. No. 10,896,669, Sercan Arik, Systems and Methods for Multi-Speaker Neural Text-To-Speech, filed May 8, 2018 Jan. 19, 2021.
U.S. Appl. No. 17/087,524, Sercan Arik, Multi-Speaker Neural Text-To-Speech, filed Nov. 2, 2020 Allowed.
U.S. Appl. No. 16/058,265 U.S. Pat. No. 10,796,686, Sercan Arik, Systems and Methods for Neural Text-To-Speech Using Convolutional Sequence Learning, filed Aug. 8, 2018 Oct. 6, 2020.
U.S. Appl. No. 16/277,919 U.S. Pat. No. 10,872,596, Wei Ping, Systems and Methods for Parallel Wave Generation in End-To-End Text-To-Speech, filed Feb. 15, 2019 Dec. 22, 2020.
U.S. Appl. No. 17/129,752 U.S. Pat. No. 11,482,207, Wei Ping, Waveform Generation Using End-To-End Text-To-Waveform System, filed Dec. 21, 2020 Oct. 25, 2022.
U.S. Appl. No. 16/654,955 U.S. Pat. No. 11,017,761, Kainan Peng, Parallel Neural Text-To-Speech, filed Oct. 16, 2019 May 25, 2021.
P. Taylor,"Text-to-Speech Synthesis," Cambridge University Press, 2009. [online], [Retrieved Sep. 3, 2019]. Retrieved from Internet <URL: <http://citeseerx.ist.psu.edu/viewdoc/download?doi=10.1.1.118.5905&rep=rep1&type=pdf>. (19 pgs).
Uria et al.,"RNADE: The real-valued neural autoregressive density-estimator," In Advances in Neural Information Processing Systems, pp. 2175-2183, 2013. (10pgs).
A.van den Oord et al.,"WaveNet: A generative model for raw audio," arXiv preprint arXiv:1609.03499, 2016. (15pgs).
A.van den Oord et al.,"Conditional image generation with PixelCNN decoders," In NIPS, 2016. (9pgs).
A.van den Oord et al.,"Parallel WaveNet: Fast high-fidelity speech synthesis," In ICML, 2018. (9pgs).
Wang et al.,"Tacotron: Towards end-to-end speech synthesis," In Interspeech, 2017. (5pgs).
R. Yamamoto,"WaveNet vocoder," 2018 [online], [Retrieved Sep. 4, 2019]. Retrieved from Internet <URL: <https://github.com/r9y9/wavenet_vocoder>. (6pgs).
Zhao et al.,"Wasserstein GAN & Waveform Loss-based acoustic model training for multi-speaker text-to-speech synthesis systems using a WaveNet vocoder," IEEE Access,2018.(10pgs).
Notice of Allowance and Fee Due dated Mar. 13, 2023, in related U.S. Appl. No. 17/087,524. (13 pgs).

* cited by examiner

*500*

> Use the ground truth training audio, the phonemes, the phoneme durations, and fundamental frequencies to train an audio synthesis model that outputs a signal representing synthesized human speech of the ground truth written text ⟋ 505

Utilize one or more implementation efficiencies to help achieve real-time or faster than real-time inference, the implementation efficiencies including but not limited to:

- avoiding any recomputation;
- doing cache-friendly memory accesses;
- parallelizing work via multithreading with efficient synchronization;
- minimizing nonlinearity FLOPs;
- avoiding cache thrashing and thread contention via thread pinning; and
- using hardware-optimized routines for matrix multiplication and convolution

⎯ 705

FIG. 7

REAL-TIME NEURAL TEXT-TO-SPEECH

CROSS-REFERENCE TO RELATED APPLICATION

This application is a continuation of and claims the priority benefit of co-pending and commonly-owned U.S. patent application Ser. No. 15/882,926, filed on 29 Jan. 2018, entitled "SYSTEMS AND METHODS FOR REAL-TIME NEURAL TEXT-TO-SPEECH," listing, Sercan Arik, Mike Chrzanowski, Adam Coates, Gregory Diamos, Andrew Gibiansky, John Miller, Andrew Ng, Jonathan Raiman, Shubharhrata Sengupta, and Mohammad Shoeybi as inventors, which claims the priority benefit of U.S. Provisional Patent Application No. 62/463,482, filed on 24 Feb. 2017, entitled "SYSTEMS AND METHODS FOR REAL-TIME NEURAL TEXT-TO-SPEECH," and listing Mohammad Shoeybi, Mike Chrzanowski, John Miller, Jonathan Raiman, Andrew Gibiansky, Shubharhrata Sengupta, Gregory Diamos, Sercan Arik, and Adam Coates as inventors. Each of the aforementioned patent documents is incorporated by reference herein in its entirety and for all purposes.

BACKGROUND

A. Technical Field

The present disclosure relates generally to systems and methods for computer learning that can provide improved computer performance, features, and uses. More particularly, the present disclosure relates to systems and methods for converting text to speech using deep neural networks.

B. Background

Synthesizing artificial human speech from text, commonly known as text-to-speech (TTS), is an essential component in many applications, such as speech-enabled devices, navigation systems, and accessibility for the visually-impaired. Fundamentally, it allows human-technology interaction without requiring visual interfaces. Modern TTS systems are based on complex, multi-stage processing pipelines, each of which may rely on hand-engineered features and heuristics. Due to this complexity, developing new TTS systems can be very labor intensive and difficult. Also, these systems typically work offline and cannot perform conversions from text to speech in real-time, which further limits their uses.

Accordingly, what is needed are systems and methods for text-to-speech service with improved quality, operation time, and efficacy.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

Figure ("FIG.") 1 illustrates a diagram depicting a training system and training procedure, according to embodiments of the present document.

FIG. 5 depicts a method for training an audio synthesis model of a text-to-speech system, according to embodiments of the present document.

FIG. 7 depicts one or more computation efficiencies that may be employed for a deployed text-to-speech system to assist it generating a signal representing synthesized human speech given an input text in real-time or faster than real-time, according to embodiments of the present document.

DETAILED DESCRIPTION OF EMBODIMENTS

Figure 1:
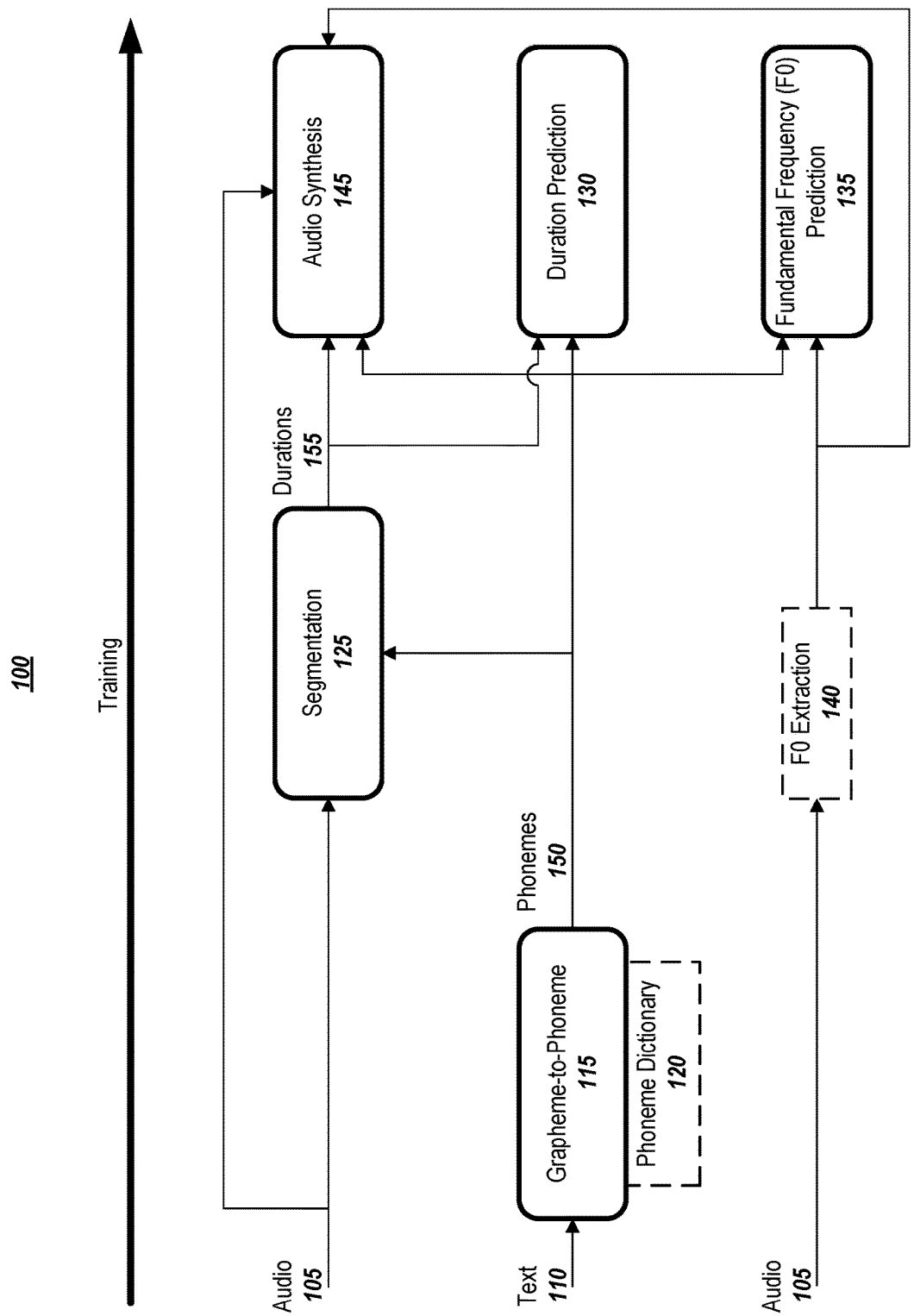

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," "embodiments," and "in embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Embodiments disclosed herein (which may be referred to generally as "Deep Voice") are inspired by traditional text-to-speech (TTS) pipelines and adopt similar structure, while replacing all component with neural networks and using simpler features: first, embodiments convert text to phonemes and then use an audio synthesis model to convert linguistic features into speech. Unlike prior approaches (which used hand-engineered features such as spectral envelope, spectral parameters, aperiodic parameters, etc.), features used by embodiments herein are phonemes with stress annotations, phoneme durations, and fundamental frequency (F0). This choice of features makes system embodiments more readily applicable to new datasets, voices, and domains without any manual data annotation or additional feature engineering. These benefits are demonstrated by retraining an embodiment's entire pipeline without any hyperparameter changes on an entirely new dataset that contains solely audio and unaligned textual transcriptions and generating relatively high-quality speech. In a conventional TTS system, this adaptation requires days to weeks of tuning.

Real-time inference is a requirement for a production-quality TTS system; without it, the system is unusable for most applications of TTS. Prior work has demonstrated that a WaveNet (van der Oord, Aaron; Dieleman, Sander; Zen, Heiga; Simonyan, Karen; Vinyals, Oriol; Graves, Alex; Kalchbrenner, Nal; Senior, Andrew; Kavukcuoglu, Koray. "WaveNet: A Generative Model for Raw Audio," arXiv: 1609.03499, 2016, which is available at arxiv.org/pdf/1609.03499.pdf (2016) and is incorporated by reference herein in its entirety) can generate close to human-level speech. However, WaveNet inference poses a daunting computational problem due to the high-frequency, autoregressive nature of the model, and it has been hitherto unknown whether such models can be used in a production system. As shown herein, that question is answered in the affirmative; and efficient, faster-than-real-time WaveNet inference kernels that produce high-quality 16 kHz audio and realize a 400× speedup over previous WaveNet inference implementations are demonstrated.

B. Related Work

Some previous approaches have used neural networks as substitutes for several TTS system components, including grapheme-to-phoneme conversion models, phoneme duration prediction models, fundamental frequency prediction models, and audio synthesis models. However, unlike Deep Voice embodiments, none of these systems solve the entire problem of TTS and many of them use specialized hand-engineered features developed specifically for their domain.

Most recently, there has been a lot of work in parametric audio synthesis, notably WaveNet, SampleRNN, and Char2Wav. While WaveNet can be used for both conditional and unconditional audio generation, SampleRNN is only used for unconditional audio generation. Char2Wav extends SampleRNN with an attention-based phoneme duration model and something like an F0 prediction model, effectively providing local conditioning information to a SampleRNN-based vocoder.

There has been a lot of recent work in parametric speech synthesis, notably WaveNet, SampleRNN, and Char2Wav (van den Oord et al. 2016, Mehri et al. 2016, Sotelo et al. 2017). While WaveNet can be used for both conditional and unconditional audio generation, SampleRNN is only used for unconditional audio generation. Char2Wav extends SampleRNN with an attention-based phoneme duration model and the equivalent of an F0 prediction model, effectively providing local conditioning information to a SampleRNN-based vocoder.

Deep Voice embodiments differ from these systems in several key aspects that notably increase the scope of the problem. First, Deep Voice embodiments are completely standalone; training a new Deep Voice system does not require a pre-existing TTS system, and can be done from scratch using a dataset of short audio clips and corresponding textual transcripts. In contrast, reproducing either of the aforementioned systems requires access and understanding of a pre-existing TTS system, because they use features from another TTS system either at training or inference time.

Second, Deep Voice embodiments minimize the use of hand-engineered features; embodiments use one-hot encoded characters for grapheme-to-phoneme conversion, one-hot encoded phonemes and stresses, phoneme durations in milliseconds, and normalized log fundamental frequency that can be computed from waveforms using any F0 estimation algorithm. All of these can easily be obtained from audio and transcripts with minimal effort or in an automated way. In contrast, prior works use a much more complex feature representation, that effectively makes reproducing the system impossible without a pre-existing TTS system. WaveNet uses several features from a TTS system, that include values such as the number of syllables in a word, position of syllables in the phrase, position of the current frame in the phoneme and dynamic features of the speech spectrum like spectral and excitation parameters as well as their time derivatives. Char2Wav relies on vocoder features from the WORLD TTS system for pretraining their alignment module, which include F0, spectral envelope, and aperiodic parameters.

Finally, Deep Voice embodiments are a result of focusing on creating a production-ready system, which demand that model embodiments run in real-time for inference. Deep Voice can synthesize audio in fractions of a second, and offers a tunable trade-off between synthesis speed and audio quality. In contrast, previous results with WaveNet require several minutes of runtime to synthesize one second of audio. The inventors are unaware of similar benchmarks for SampleRNN, but the 3-tier architecture as originally described in the publication requires approximately 4-5× as much compute during inference as the largest WaveNet model embodiments herein, so running the model in real-time may prove challenging.

C. Embodiments of TTS System Components

Figure 2:
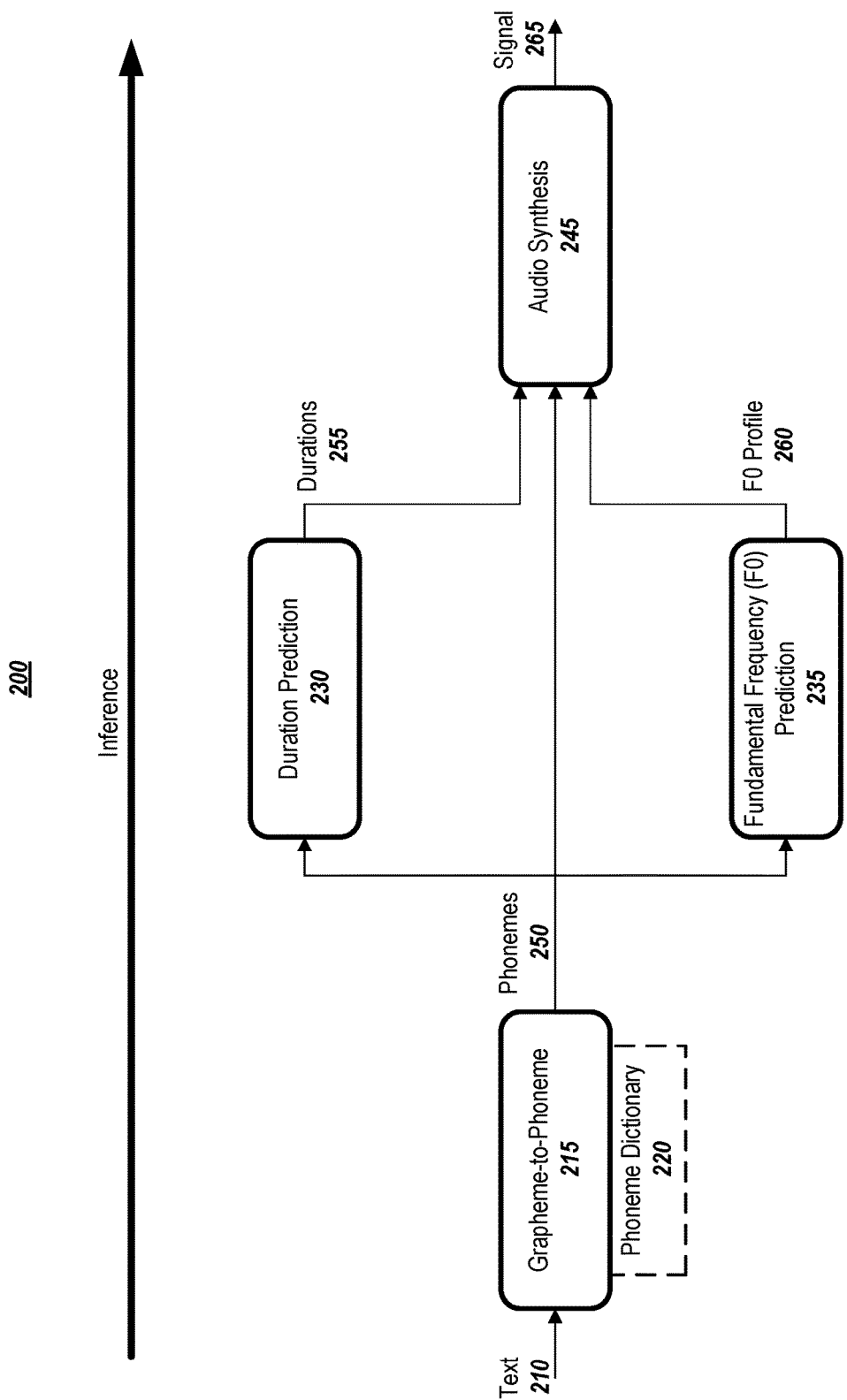
FIG. 2 illustrates a diagram depicting an inference system and procedure, according to embodiments of the present document.

FIGS. 1 and 2 illustrate diagrams depicting a training system and procedure (FIG. 1) and an inference system and procedure (FIG. 2), with inputs on the left and outputs on the right, according to embodiments of the present patent document. In embodiments, a duration prediction model 130/230 and the F0 prediction model 135/235 may be performed by a single neural network trained with a joint loss. In embodiments, a grapheme-to-phoneme model 115/215 is used as a fallback for words that are not present in a phoneme dictionary 120/220, such as CMUDict. In embodiments, the phoneme dictionary 120/220 and the fundamental frequency extraction unit 140 are non-learned components.

As shown in FIG. 1, embodiments of the TTS system comprise five major components, at least during training. It shall be noted that a trained system deployed for inference comprises some corresponding components as illustrated in FIG. 2.

(1) The grapheme-to-phoneme model 115/215 converts from written text (e.g., English characters) to phonemes (e.g., encoded using a phonemic alphabet such as ARPA-BET).

(2) The segmentation model 125 locates phoneme boundaries in the voice dataset. Given an audio file 105 and a phoneme-by-phoneme transcription 150 of the audio, the segmentation model 125 identifies where in the audio each phoneme begins and ends.

(3) The phoneme duration model 130/230 predicts the temporal duration of every phoneme in a phoneme sequence (e.g., an utterance).

(4) The fundamental frequency model 135/235 predicts whether a phoneme is voiced. If it is, the model predicts the fundamental frequency (F0) throughout the phoneme's duration.

(5) The audio synthesis model 145/245 combines the outputs of the grapheme-to-phoneme, phoneme durations, and fundamental frequency prediction models and synthesizes audio at a high sampling rate, corresponding to the desired text.

During inference (e.g., FIG. 2), text 210 is fed through the grapheme-to-phoneme model 215 to generate phonemes 250. Next, the phonemes 250 are provided as inputs to the phoneme duration model 230 and F0 prediction model 235 to assign durations to each phoneme and generate an F0 contour or profile 260. Finally, the phonemes, phoneme durations, and F0 are used as local conditioning input features to the audio synthesis model 245, which generates the final utterance 265.

In embodiments, unlike the other models, the segmentation model 125 is not used during inference. Instead, it may be used to annotate the training voice data with phoneme boundaries. In embodiments, the phoneme boundaries imply durations, which may be used to train the phoneme duration model. In embodiments, the audio, annotated with phonemes and phoneme durations as well as fundamental frequency, is used to train the audio synthesis model.

All the components are described in detail in the following sections.

1. Grapheme-to-Phoneme Model Embodiments

Embodiments of the grapheme-to-phoneme model may be based on the encoder-decoder architecture developed by Kaisheng Yao and Geoffrey Zweig, which is discussed in Yao & Zweig, "Sequence-To-Sequence Neural Net Models for Grapheme-To-Phoneme Conversion," arXiv preprint arXiv:1506.00196, 2015, which is available at arxiv.org/pdf/1506.00196.pdf (2015) and is incorporated by reference herein in its entirety. However, embodiments herein use a multi-layer bidirectional encoder with a gated recurrent unit (GRU) nonlinearity and an equally deep unidirectional GRU decoder. In embodiments, the initial state of every decoder layer is initialized to the final hidden state of the corresponding encoder forward layer. In embodiments, the architecture is trained with teacher forcing and decoding is performed using beam search. Embodiments use 3 bidirectional layers with 1024 units each in the encoder and 3 unidirectional layers of the same size in the decoder and a beam search with a width of 5 candidates. During training, embodiments may use dropout with probability 0.95 after each recurrent layer.

In embodiments, for training, the Adam optimization algorithm with $\beta_1=0.9$, $\beta_2=0.999$, $\varepsilon=10^{-8}$, a batch size of 64, a learning rate of $10^{-3}$, and an annealing rate of 0.85 every 1000 iterations was used.

2. Segmentation Model Embodiments

Embodiments of the segmentation model are trained to output the alignment between a given utterance and a sequence of target phonemes. This task is similar to the problem of aligning speech to written output in speech recognition. In that domain, the connectionist temporal classification (CTC) loss function has been shown to focus on character alignments to learn a mapping between sound and text. In embodiments, the convolutional recurrent neural network architecture from a state-of-the-art speech recognition system (as disclosed in U.S. patent application Ser. No. 15/358,102, filed on 21 Nov. 2016, entitled "END-TO-END SPEECH RECOGNITION," and U.S. patent application Ser. No. 15/358,083, filed on 21 Nov. 2016, entitled "DEPLOYED END-TO-END SPEECH RECOGNITION," each of which is incorporated by reference herein in its entirety) may be adapted for phoneme boundary detection. Examples of such an architecture comprise multiple convolutional layers followed by multiple recurrent layers.

A network trained with CTC to generate sequences of phonemes will produce brief peaks for every output phoneme. Although this is sufficient to roughly align the phonemes to the audio, it may be insufficient to detect precise phoneme boundaries. To overcome this, embodiments are trained to predict sequences of phoneme pairs rather than single phonemes. Embodiments of the network will then tend to output phoneme pairs at timesteps close to the boundary between two phonemes in a pair.

To illustrate an embodiment of label encoding used in embodiments, consider the string "Hello!". To convert this to a sequence of phoneme pair labels, convert the utterance to phonemes (using a pronunciation dictionary such as CMUDict or a grapheme-to-phoneme model (e.g., model 115/215) and pad the phoneme sequence on either end with the silence phoneme to get "sil HH EH L OW sil". Finally, construct consecutive phoneme pairs and get "(sil, HH), (HH, EH), (EH, L), (L, OW), (OW, sil)".

In embodiments, input audio is featurized by computing 20 Mel-frequency cepstral coefficients (MFCCs) with a ten-millisecond stride. On top of the input layer, in embodiments, there are two convolution layers (2D convolutions in time and frequency), three bidirectional recurrent GRU layers, and finally a softmax output layer. In embodiments, the convolution layers use kernels with unit stride, height nine (in frequency bins), and width five (in time) and the recurrent layers use 512 GRU cells (for each direction). Dropout with a probability of 0.95 may be applied after the last convolution and recurrent layers. To compute the phoneme-pair error rate (PPER), decoding may be done using beam search. To decode phoneme boundaries, embodiments perform a beam search with width 50 with the constraint that neighboring phoneme pairs overlap by at least one phoneme and keep track of the positions in the utterance of each phoneme pair.

For training, the Adam optimization algorithm with $\beta_1=0.9$, $\beta_2=0.999$, $\varepsilon=10^{-8}$, a batch size of 128, a learning rate of $10^{-4}$, and an annealing rate of 0.95 every 500 iterations may be used.

3. Phoneme Duration and Fundamental Frequency Model Embodiments

In embodiments, a single architecture is used to jointly predict phoneme duration and time-dependent fundamental frequency. In embodiments, the input to embodiments of the model is a sequence of phonemes with stresses, with each phoneme and stress being encoded as a one-hot vector. Embodiments of the architecture comprise two fully connected layers with 256 units each followed by two unidirectional recurrent layers with 128 GRU cells each and finally a fully-connected output layer. In embodiments, dropout with a probability of 0.8 is applied after the initial fully-connected layers and the last recurrent layer.

In embodiments, the final layer produces three estimations for every input phoneme: the phoneme duration, the probability that the phoneme is voiced (i.e., has a fundamental frequency), and 20 time-dependent F0 values, which are sampled uniformly over the predicted duration.

Model embodiments may be optimized by minimizing a joint loss that combines phoneme duration error, fundamental frequency error, the negative log likelihood of the probability that the phoneme is voiced, and a penalty term proportional to the absolute change of F0 with respect to time to impose smoothness. An embodiment of the specific functional form of the loss function is described in Appendix B.

For training, the Adam optimization algorithm with $\beta_1=0.9$, $\beta_2=0.999$, $\varepsilon=10^{-8}$, a batch size of 128, a learning rate of $3\times10^{-4}$, and an annealing rate of 0.9886 every 400 iterations was used.

4. Audio Synthesis Model Embodiments

Embodiments of the audio synthesis model are a variant of WaveNet. WaveNet consists of a conditioning network, which upsamples linguistic features to the desired frequency, and an autoregressive network, which generates a probability distribution $\mathbb{P}(y)$ over discretized audio samples $y\in\{0, 1, \ldots, 255\}$. In embodiments, the number of layers $\ell$, the number of residual channels r (dimension of the hidden state of every layer), and the number of skip channels s (the dimension to which layer outputs are projected prior to the output layer).

WaveNet consists of an upsampling and conditioning network, followed by $\ell$ 2×1 convolution layers with r residual output channels and gated tan h nonlinearities. In embodiments, the convolution is broken into two matrix multiplies per timestep with $W_{prev}$ and $W_{cur}$. These layers may be connected with residual connections. The hidden state of every layer may be concatenated to an $\ell$ r vector and projected to s skip channels with $W_{skip}$, followed by two layers of 1×1 convolutions (with weights $W_{relu}$ and $W_{out}$) with relu nonlinearities.

WaveNet uses transposed convolutions for upsampling and conditioning. It was found that model embodiments perform better, train faster, and require fewer parameters if the embodiments instead first encode the inputs with a stack of bidirectional quasi-RNN (QRNN) layers and then perform upsampling by repetition to the desired frequency.

One of the highest-quality final model used $\ell=40$ layers, r=64 residual channels, and s=256 skip channels. For training, the Adam optimization algorithm with $\beta_1=0.9$, $\beta_2=0.999$, $\varepsilon=10^{-8}$, a batch size of 8, a learning rate of $10^{-3}$, and an annealing rate of 0.9886 every 1000 iterations was used.

Appendix A includes details of the modified WaveNet architecture and the QRNN layers that embodiments used.

5. Training and Inference Method Embodiments

Figure 3:
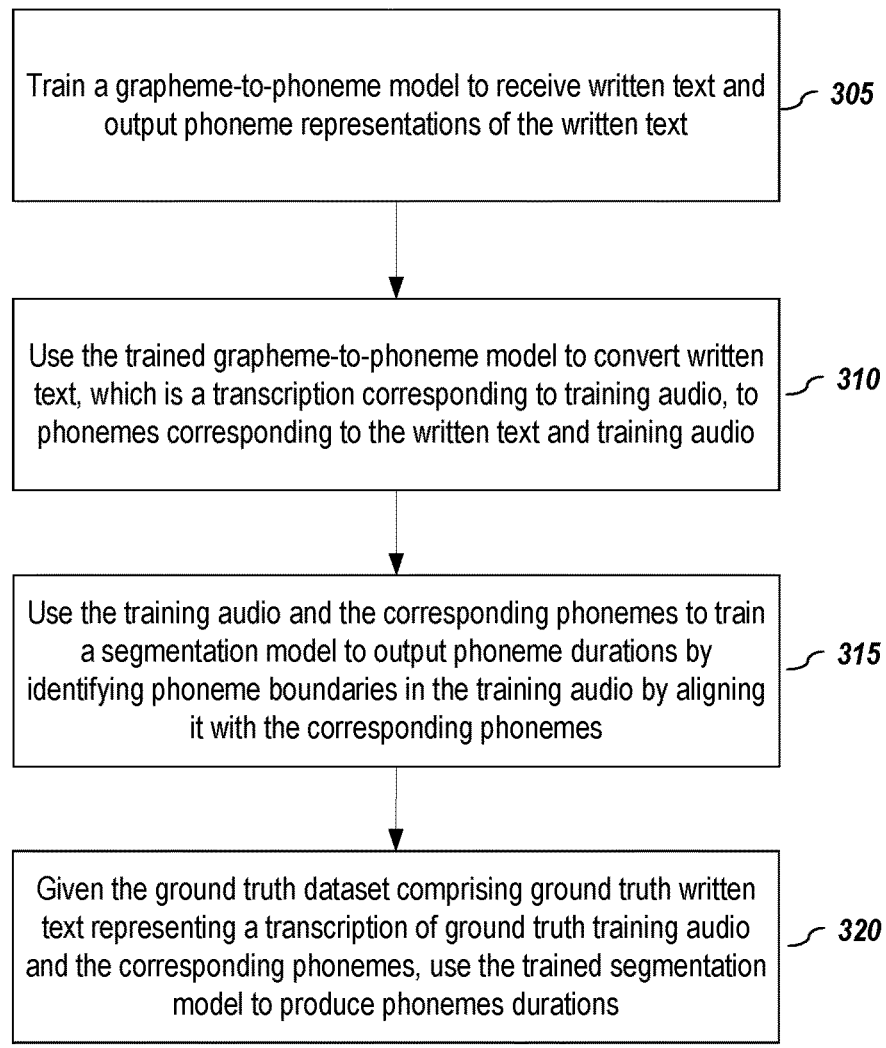
FIG. 3 depicts a method for generating a training dataset to be used to train a text-to-speech system, according to embodiments of the present document.

FIG. 3 depicts a method for generating a training dataset to be used to train a text-to-speech system, according to embodiments of the present document. In embodiments, a grapheme-to-phoneme model, such as model 115 in FIG. 1, is trained (305) to receive written text and output phoneme representations of the written text. In embodiments, a dictionary, such as, by way of example and not limitation, CMUDict by Carnegie Mellon University. Such dictionaries contain words in written text and the corresponding pronunciations as represented in phonemes with stress indication where appropriate and may be used to train the grapheme-to-phoneme model because it includes the ground truth text and the corresponding ground truth phonemes. In embodiments, the grapheme-to-phoneme may use the dictionary (which may be augmented to include phonemes that were hand-labeled by one or more people) as a look-up for words that exists in the dictionary and may use the model neural network for other words not found in the dictionary.

Given the trained grapheme-to-phoneme model, it may be used (310) to convert written text, which is a transcription corresponding to training audio, to phonemes. Thus, the phonemes correspond to the written text and to the training audio.

The training audio and the corresponding phonemes may be used to train (315) a segmentation model (e.g., segmentation model 125 in FIG. 1) to output phoneme durations by identifying phoneme boundaries in the training audio by aligning it with the corresponding phonemes. As discussed above, the segmentation model may be trained to predict sequences of phonemes in pairs and using a CTC loss function identify a boundary between the two phonemes of a pair.

Finally, as depicted in FIG. 3, in embodiments, the trained segmentation model may be used (320) to produce phonemes durations given the ground truth training audio and the corresponding phonemes. In embodiments, the ground truth audio, the phonemes, and the phoneme durations can be used to train additional models used in embodiments of a text-to-speech system.

Figure 4:
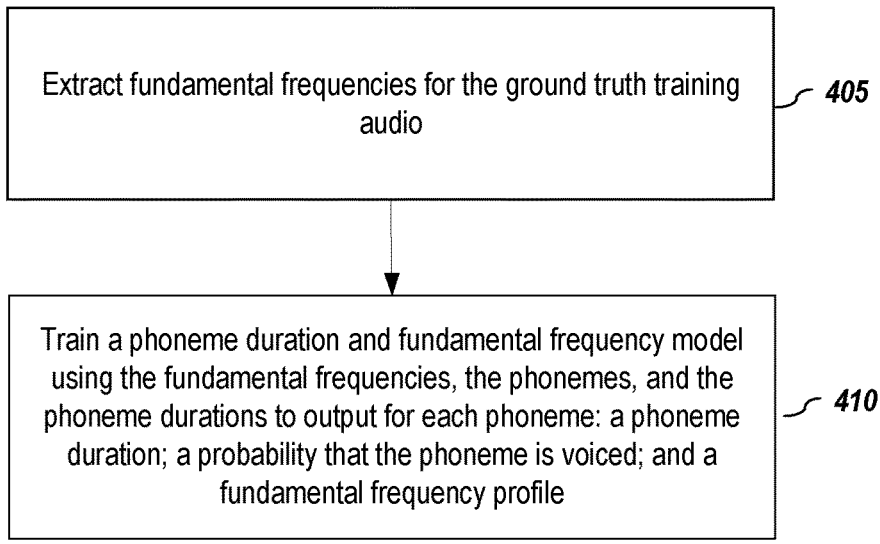
FIG. 4 depicts a method for training a phoneme duration and fundamental frequency model or models, according to embodiments of the present document.

FIG. 4 depicts a method for training a phoneme duration and fundamental frequency model or models, according to embodiments of the present document. In embodiments, as a pre-processing stage (e.g., F0 extraction 140 in FIG. 1), the fundamental frequencies for the ground truth training audio are extracted (405). Then, a phoneme duration and fundamental frequency model (e.g., model 130 and model 135 in FIG. 1) may be trained (410) using the fundamental frequencies, the phonemes, and the phoneme durations to output for each phoneme: a phoneme duration; a probability that the phoneme is voiced; and a fundamental frequency profile. It should be noted that the phoneme duration and fundamental frequency model may be the same model or may be separate models.

FIG. 5 depicts a method for training an audio synthesis model of a text-to-speech system, according to embodiments of the present document. In embodiments, using the ground truth training audio, the phonemes, the phoneme durations, and the fundamental frequencies, an audio synthesis model (e.g., audio synthesis model 145 in FIG. 1) may be trained (505) to receive those inputs and output a signal that represents synthesized human speech of the ground truth written text.

Having trained the various models, the trained models may form a text-to-speech system. As noted previously and as illustrated in the embodiment depicted in FIG. 2, a deployed text-to-speech system does not utilize the segmentation model. Rather, embodiments of text-to-speech system comprise a trained grapheme-to-phoneme model 215 (which may also comprise use of a dictionary look-up 220), trained phoneme duration 230 and fundamental frequency 235 model or models, and a trained audio synthesis model 245. As explained in more detail with reference to FIG. 6, such a system 200 receives an input text 210 and outputs a signal that represents synthesized human speech of the input text. In embodiments, the signal may be an audio signal.

Figure 6:
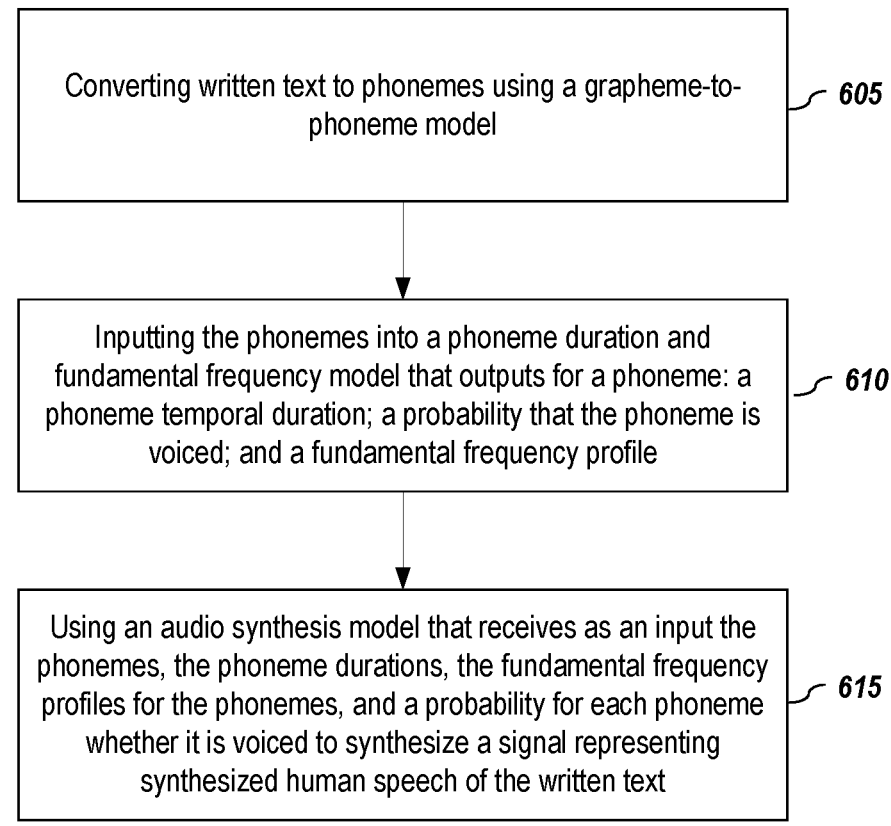
FIG. 6 depicts a method for using a deployed text-to-speech system to generate a signal representing synthesized human speech given an input text, according to embodiments of the present document.

FIG. 6 depicts a method for using a deployed text-to-speech system to generate a signal representing synthesized human speech given an input text, according to embodiments of the present document. In embodiments, the grapheme-to-phoneme model is used to convert (605) the input written text to phonemes. These phonemes may then be input (610) into a phoneme duration and fundamental frequency model or models that output for each phoneme: a phoneme duration; a probability that the phoneme is voiced; and a fundamental frequency profile. Finally, the audio synthesis model receives as inputs the phonemes, the phoneme durations, the fundamental frequency profiles for the phonemes, and the probabilities whether the phonemes are voiced to synthesize (615) a signal representing synthesized human speech of the written text.

As noted, among the benefits of embodiments of the text-to-speech system discussed herein that it is constructed from deep neural networks is that one or more implementation efficiencies may be employed to help speed the inference. FIG. 7 depicts one or more computation efficiencies that may be employed for a deployed text-to-speech system to assist it generating a signal representing synthesized human speech given an input text in real-time or faster than real-time, according to embodiments of the present document. As discussed herein, an embodiment may utilize (705) one or more implementation efficiencies to help achieve real-time or faster than real-time inference. Examples of the implementation efficiencies including, but not limited to: avoiding any recomputation; doing cache-friendly memory accesses; parallelizing work via multi-threading with efficient synchronization; minimizing non-linearity FLOPs; avoiding cache thrashing and thread contention via thread pinning; and using hardware-optimized routines for matrix multiplication and convolution.

D. Results

It shall be noted that these experiments and results are provided by way of illustration and were performed under specific conditions using a specific embodiment or embodiments; accordingly, neither these experiments nor their results shall be used to limit the scope of the disclosure of the current patent document.

Embodiments of the models were trained on an internal English speech database containing approximately 20 hours of speech data segmented into 13,079 utterances. In addition, audio synthesis results are presented for embodiments of the models trained on a subset of the Blizzard 2013 data. Both datasets are spoken by a professional female speaker.

Embodiments of the models were implemented using the TensorFlow framework.

1. Segmentation Results

In embodiments, input audio was featurized by computing 20 Mel-frequency cepstral coefficients (MFCCs) with a ten-millisecond stride. Model embodiments may have two convolution layers with unit stride, height nine (in frequency bins), and width five (in time), followed by three bidirectional recurrent GRU layers with 512 GRU units (for each direction). Dropout with a probability of 0.95 was applied on the last convolution and recurrent layers.

Training was performed using 8 TitanX Maxwell GPUs (by Nvidia based in Santa Clara, Calif.), splitting each batch equally among the GPUs and using a ring all-reduce to average gradients computed on different GPUs, with each iteration taking approximately 1300 milliseconds. After approximately 14,000 iterations, the model converged to a phoneme pair error rate (PPER) of 7%. It was found that phoneme boundaries do not have to be precise, and randomly shifting phoneme boundaries by 10-30 milliseconds makes no difference in the audio quality, and so suspect that audio quality is insensitive to the phoneme pair error rate past a certain point.

2. Grapheme-to-Phoneme Results

A grapheme-to-phoneme model embodiment was trained on data obtained from CMUDict. In embodiments, all words that do not start with a letter, contain numbers, or have multiple pronunciations, were removed, which left 124,978 out of the original 133,854 grapheme-phoneme sequence pairs.

Training was performed using a single TitanX Maxwell GPU with each iteration taking approximately 150 milliseconds. After approximately 20,000 iterations, the model converged to a phoneme error rate of 5.8% and a word error rate of 28.7%. Unlike prior work, a language model was not used in embodiments during decoding and words with multiple pronunciations were not included in the data set.

3. Phoneme Duration and Fundamental Frequency Results

Training was performed using a single TitanX Maxwell GPU with each iteration taking approximately 120 milliseconds. After approximately 20,000 iterations, the model converged to a mean absolute error of 38 milliseconds (for phoneme duration) and 29.4 Hz (for fundamental frequency).

4. Audio Synthesis Results

In embodiments, the utterances in the audio dataset were divided into one second chunks with a quarter second of context for each chunk, padding each utterance with a quarter second of silence at the beginning. Chunks that were predominantly silence were removed, leaving 74,348 total chunks.

Embodiments of the models were trained with varying depth, including 10, 20, 30, and 40 layers in the residual layer stack. It was found that models below 20 layers result in poor quality audio. The 20, 30, and 40 layer models all produced high quality recognizable speech, but the 40 layer models have less noise than the 20 layer models, which can be detected with high-quality over-ear headphones.

Previous approaches emphasized the importance of receptive field size in determining model quality. Indeed, the 20 layer models have half the receptive field as the 40 layer models. However, when run at 48 kHz, models with 40 layers have only 83 milliseconds of receptive field, but still generate high quality audio. This suggests the receptive field of the 20 layer models is sufficient, and the difference in audio quality may be due to some other factor than receptive field size.

In addition to varying model depth, the number of residual channels and number of skip channels were also varied in embodiments. It was found that both of these parameters were important to high quality synthesis, and that lowering them below a certain point led to noisy audio and mispronounced phonemes.

Training was performed using 8 TitanX Maxwell GPUs with one chunk per GPU, using a ring allreduce to average gradients computed on different GPUs. Each iteration took approximately 450 milliseconds. The model converged after approximately 300,000 iterations. It was found that a single 1.25 s chunk was sufficient to saturate the compute on the GPU and that batching did not increase training efficiency.

As is common with high-dimensional generative models, model loss is somewhat uncorrelated with perceptual quality of individual samples. While models with unusually high loss sound distinctly noisy, models that optimize below a certain threshold do not have a loss indicative of their quality. In addition, changes in model architecture (such as depth and output frequency) can have a significant impact on model loss while having a small effect on audio quality.

To estimate perceptual quality of the individual stages of an embodiment of the TTS pipeline, mean opinion score (MOS) ratings (ratings between one and five with higher values being better) were crowdsourced from Mechanical Turk using the CrowdMOS toolkit and methodology. In order to separate the effect of the audio preprocessing, the WaveNet model quality, and the phoneme duration and fundamental frequency model quality, MOS scores are presented for a variety of utterance types, including synthesis results where the WaveNet inputs (duration and F0) are extracted from ground truth audio rather than synthesized by other models. The results are presented in Table 1. We purposefully include ground truth samples in every batch of samples that raters evaluate to highlight the delta from human speech and allow raters to distinguish finer grained differences between models; a downside of this approach is that the resulting MOS scores will be significantly lower than if raters are presented only with synthesized audio samples.

TABLE 1

Mean Opinion Scores (MOS) and 95% confidence intervals (CIs) for utterances.

| Type | Model Size | MOS ± CI |
| --- | --- | --- |
| Ground Truth (48 kHz) | None | 4.75 ± 0.12 |
| Ground Truth | None | 4.45 ± 0.16 |
| Ground Truth (companded and expanded) | None | 4.34 ± 0.18 |
| Synthesized | $\ell = 40, r = 64, s = 256$ | 3.94 ± 0.26 |
| Synthesized (48 kHz) | $\ell = 40, r = 64, s = 256$ | 3.84 ± 0.24 |
| Synthesized (Synthesized F0) | $\ell = 40, r = 64, s = 256$ | 2.76 ± 0.31 |
| Synthesized (Synthesized Duration and F0) | $\ell = 40, r = 64, s = 256$ | 2.00 ± 0.23 |
| Synthesized (2X real-time inference) | $\ell = 20, r = 32, s = 128$ | 2.74 ± 0.32 |
| Synthesized (1X real-time inference) | $\ell = 20, r = 64, s = 128$ | 3.35 ± 0.31 |

This MOS score is a relative MOS score obtained by showing raters the same utterance across all the model types (which encourages comparative rating and allows the raters to distinguish finer grained differences). Every batch of samples also includes the ground truth 48 kHz recording, which makes all our ratings comparative to natural human voices. 474 ratings were collected for every sample. Unless otherwise mentioned, models used phoneme durations and F0 extracted from the ground truth, rather than synthesized by the duration prediction and frequency prediction models, as well as a 16384 Hz audio sampling rate.

First of all, a significant drop in MOS was found when simply downsampling the audio stream from 48 kHz to 16 kHz, especially in combination with μ-law companding and quantization, likely because a 48 kHz sample is presented to the raters as a baseline for a 5 score, and a low quality noisy synthesis result is presented as a 1. When used with ground truth durations and F0, embodiments of the models score highly, with the 95% confidence intervals of our models intersecting those of the ground truth samples. However, using synthesized frequency reduces the MOS, and further including synthesized durations reduces it significantly. It may be concluded that a main barrier to progress towards natural TTS lies with duration and fundamental frequency prediction. Finally, some of the best embodiment of the models run slightly slower than real-time (see Table 2), so it is demonstrated that synthesis quality can be traded for inference speed by adjusting model size by obtaining scores for models that run 1× and 2× faster than real-time.

Also tested were WaveNet models trained on the full set of features from the original WaveNet publication, but found no perceptual difference between those models and models trained on our reduced feature set.

5. Blizzard Results

To demonstrate the flexibility of embodiments of the present system, all the experiment models were retrained with identical hyperparameters on the Blizzard 2013 dataset. For the experiments, a 20.5-hour subset of the dataset segmented into 9,741 utterances was used. The model was evaluated using the procedure described in Section D.4, which encouraged raters to compare synthesized audio directly with the ground truth. On the held-out set, 16 kHz companded and expanded audio received a MOS score of 4.65±0.13, while our synthesized audio received a MOS score of 2.67±0.37.

E. Embodiments of Optimizing Inference

Although WaveNet has shown promise in generating high-quality synthesized speech, initial experiments reported generation times of many minutes or hours for short utterances. WaveNet inference poses an incredibly challenging computational problem due to the high-frequency, autoregressive nature of the model. When generating audio, a single sample must be generated in approximately 60 μs (for 16 kHz audio) or 20 μs (for 48 kHz audio). For the 40-layer model embodiments, this means that a single layer (comprising several matrix multiplies and nonlinearities) must complete in approximately 1.5 μs. For comparison, accessing a value that resides in main memory on a CPU can take 0.1 μs. In order to perform inference at real-time, great care should be taken to not recompute any results, store the entire model in the processor cache (as opposed to main memory), and optimally utilize the available computational units.

Synthesizing one second of audio with our 40 layer WaveNet model embodiment takes approximately $55 \times 10^9$ floating point operations (FLOPs). The activations in any given layer depend on the activations in the previous layer and the previous timestep, so inference must be done one timestep and one layer at a time. A single layer requires only $42 \times 10^3$ FLOPs, which makes achieving meaningful parallelism difficult. In addition to the compute requirements, the model has approximately $1.6 \times 10^6$ parameters, which equate to about 6.4 MB if represented in single precision. (See Appendix E for a complete performance model.)

On CPU, a single Haswell or Broadwell core has a peak single-precision throughput of approximately $77 \times 10^9$ floating point operations per second (FLOPS), and an L2-to-L1 cache bandwidth of approximately 140 GB/s (assuming two 8-wide AVX FMA instructions every cycle and an L2-to-L1 bandwidth of 64 bytes per cycle). The model is loaded from cache once per timestep, which requires a bandwidth of 100 GB/s. Even if the model were to fit in L2 cache, the implementation would need to utilize 70% of the maximum bandwidth and 70% of the peak FLOPS in order to do inference in real-time on a single core. Splitting the calculations across multiple cores reduces the difficulty of the problem, but nonetheless it remains challenging as inference must operate at a significant fraction of maximum memory bandwidth and peak FLOPs and while keeping threads synchronized.

A GPU has higher memory bandwidth and peak FLOPs than a CPU but provides a more specialized and hence restrictive computational model. A naive implementation that launches a single kernel for every layer or timestep is untenable, but an implementation based on a persistent RNN technique, as described in U.S. patent application Ser. No. 15/091,413, filed on Apr. 5, 2016, entitled "SYSTEMS AND METHODS FOR A MULTI-CORE OPTIMIZED RECURRENT NEURAL NETWORK," and listing Diamos et al. as inventors (which is incorporated by reference herein in its entirety), may be able to take advantage of the throughput offered by GPUs.

High-speed optimized inference kernels were implemented for both CPU and GPU, and it was demonstrated that WaveNet embodiment inference at faster-than-real-time speeds is achievable. Table 2 lists the CPU and GPU inference speeds for different models. In both cases, the benchmarks include only the autoregressive, high-frequency audio generation and do not include the generation of linguistic conditioning features (which can be done in parallel for the entire utterance). The CPU kernel embodiments run at real-time or faster than real-time for a subset of models, while the GPU models do not yet match this performance.

TABLE 2

CPU and GPU inference kernel benchmarks for different models in float32 and int16. At least one main and one auxiliary thread were used for all CPU kernels. These kernels operate on a single utterance with no batching. CPU results are from an Intel Xeon E5-2660 v3 Haswell processor clocked at 2.6 GHz and GPU results are from a GeForce GTX Titan X Maxwell GPU.

| Model | Platform | Data Type | No. of Threads | Speed × Realtime |
|---|---|---|---|---|
| ℓ = 20, r = 32, s = 128 | CPU | float32 | 6 | 2.7 |
| ℓ = 20, r = 32, s = 128 | CPU | float32 | 2 | 2.05 |
| ℓ = 20, r = 64, s = 128 | CPU | int16 | 2 | 1.2 |
| ℓ = 20, r = 64, s = 128 | CPU | float32 | 6 | 1.11 |
| ℓ = 20, r = 64, s = 128 | CPU | float32 | 2 | 0.79 |
| ℓ = 40, r = 64, s = 256 | CPU | int16 | 2 | 0.67 |
| ℓ = 40, r = 64, s = 256 | CPU | float32 | 6 | 0.61 |
| ℓ = 40, r = 64, s = 256 | CPU | float32 | 2 | 0.35 |
| ℓ = 20, r = 32, s = 128 | GPU | float32 | N/A | 0.39 |
| ℓ = 20, r = 64, s = 128 | GPU | float32 | N/A | 0.29 |
| ℓ = 40, r = 32, s = 128 | GPU | float32 | N/A | 0.23 |
| ℓ = 40, r = 64, s = 128 | GPU | float32 | N/A | 0.17 |

1. CPU Implementation Embodiments

Embodiments achieve real-time CPU inference by avoiding any recomputation, doing cache-friendly memory accesses, parallelizing work via multithreading with efficient synchronization, minimizing nonlinearity FLOPs, avoiding cache thrashing and thread contention via thread pinning, and using custom hardware-optimized routines for matrix multiplication and convolution.

In embodiments, for a CPU implementation, the computation may be split into the following steps:

1. Sample Embedding: Compute the WaveNet input causal convolution by doing two sample embeddings, one for the current timestep and one for the previous timestep, and summing them with a bias. That is, $$x^{(0)} = W_{emb,prev} \cdot y_{i-1} + W_{emb,cur} \cdot y_i + B_{embed} \qquad (1)$$

2. Layer Inference: For every layer j from j=1 to $\ell$ with dilation width d:

(a) Compute the left half of the width-two dilated convolution via a matrix-vector multiply:

$$a_{prev}^{(j)} = W_{prev}^{(j)} \cdot x_{i-d}^{(j-1)} \quad (2)$$

(b) Compute the right hand of the dilated convolution:

$$a_{cur}^{(j)} = W_{cur}^{(j)} \cdot x_i^{(j-1)} \quad (3)$$

(c) Compute the hidden state $h^{(j)}$ given the conditioning vector $L_h^{(j)}$:

$$a^{(j)} = a_{prev}^{(j)} + a_{cur}^{(j)} + B_h^{(j)} + L_h^{(j)} \quad (4)$$

$$h^{(j)} = \tan h(a_{0:r}^{(j)}) \cdot \sigma(a_{r:2r}^{(j)}) \quad (5)$$

where $v_{0:r}$ denotes the first r elements of the vector v and $v_{r:2r}$ denotes the next r elements. Then, compute the input to the next layer via a matrix-vector multiply:

$$x^{(j)} = W_{res}^{(j)} \cdot h^{(j)} + B_{res}^{(j)} \quad (6)$$

(d) Compute the contribution to the skip-channel matrix multiply from this layer, accumulating over all layers with $q^{(0)} = B_{skip}$:

$$q^{(j)} = q^{(j-1)} + W_{skip}^{(j)} \cdot h^{(j)} \quad (7)$$

3. Output: Compute the two output 1×1 convolutions:

$$z_s = \text{relu}(q^{(\ell)}) \quad (8)$$

$$z_a = \text{relu}(W_{relu} \cdot z_s + B_{relu}) \quad (9)$$

$$p = \text{softmax}(W_{out} \cdot z_a + B_{out}) \quad (10)$$

Finally, sample $y_{i+i}$ randomly from the distribution p.

Figure 8:
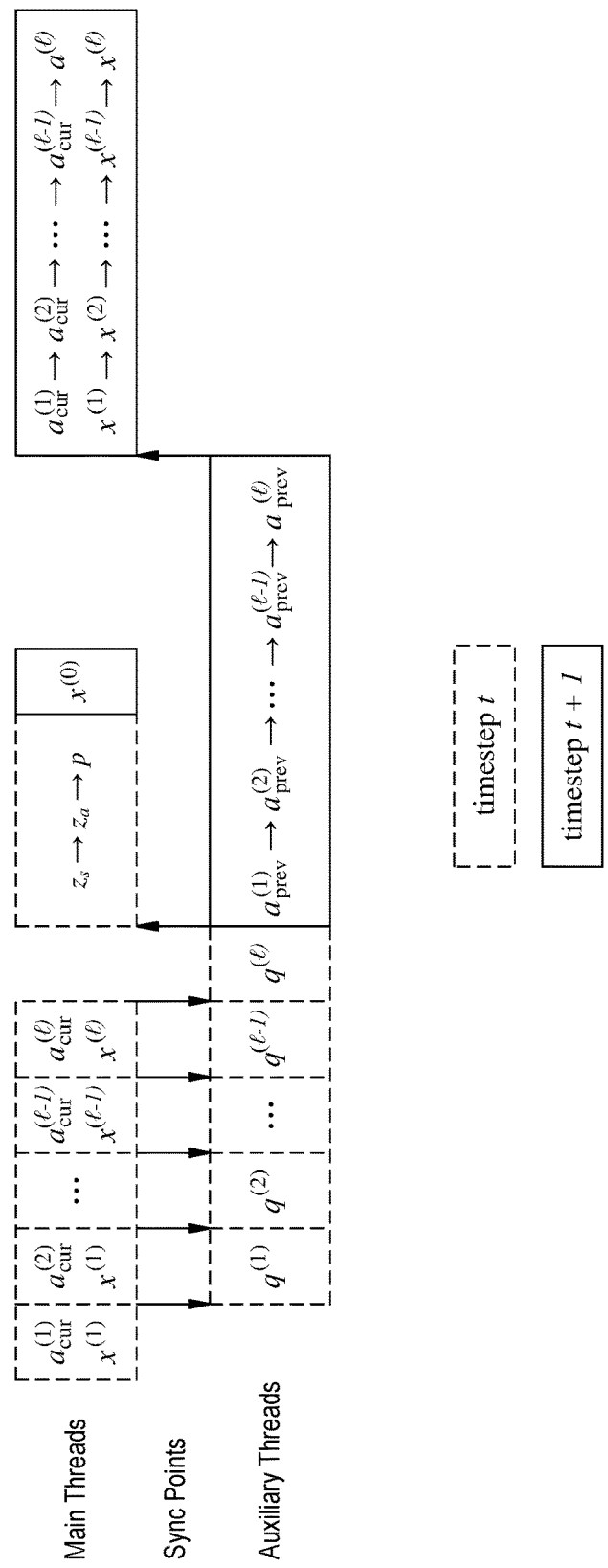
FIG. 8 depicts two groups of threads run in parallel according to embodiments of the present document.

These are parallelized across two groups of threads as depicted in FIG. 8. In embodiments, computation of the $W_{skip}$ is offloaded to the auxiliary threads while the main threads progress through the stack of WaveNet layers. While the main threads are computing the output layer, the auxiliary threads prepare the left $W_{prev}$ half of the WaveNet layer convolutions for the upcoming timestep. Arrows indicate where one thread group waits on results from the other thread group, and may be implemented as spinlocks.

In embodiments, a group of main threads computes $x^{(0)}$, $a_{cur}^{(j)}$, $h^{(j)}$, $x^{(j)}$, $z_a$, and p. A group of auxiliary threads computes $a_{prev}^{(j)}$, $q^{(j)}$, and $z_s$, with the $a_{prev}^{(j)}$ being computed for the next upcoming timestep while the main threads compute $z_a$ and p. In embodiments, each of these groups can comprise a single thread or multiple threads; if there are multiple threads, each thread computes one block of each matrix-vector multiply, binary operation, or unary operation, and thread barriers are inserted as needed. Splitting the model across multiple threads both splits up the compute and may also be used to ensure that the model weights fit into the processor L2 cache.

In embodiments, pinning threads to physical cores (or disabling hyperthreading) can be important for avoiding thread contention and cache thrashing and increases performance by approximately 30%.

Depending on model size, the nonlinearities (tan h, sigmoid, and softmax) may also take a significant fraction of inference time, so, in embodiments, all nonlinearities may be replaced with high-accuracy approximations, which are detailed in Appendix C. The maximum absolute error arising from these approximations is $1.5 \times 10^{-3}$ for tan h, $2.5 \times 10^{-3}$ for sigmoid, and $2.4 \times 10^{-3}$ for $e^x$. With approximate instead of exact nonlinearities, performance increases by roughly 30%.

Embodiments also implemented inference with weight matrices quantized to int 16 and found no change in perceptual quality when using quantization. For larger models, quantization offers a significant speedup when using fewer threads, but overhead of thread synchronization may prevent it from being useful with a larger number of threads.

In embodiments, to improve computational throughput, custom AVX assembly kernels for matrix-vector multiplication may be written using, for example, PeachPy specialized to embodiments' matrix sizes. Inference using the custom assembly kernels is up to 1.5× faster than Intel MKL and 3.5× faster than OpenBLAS when using float32. Neither library provides the equivalent int16 operations.

2. GPU Implementation Embodiments

Due to their computational intensity, many neural models are ultimately deployed on GPUs, which can have a much higher computational throughput than CPUs. Since embodiments of the models can be memory bandwidth and FLOP bound, it may seem like a natural choice to run inference on a GPU, but it turns out that comes with a different set of challenges.

Usually, code is run on the GPU in a sequence of kernel invocations, with every matrix multiply or vector operation being its own kernel. However, the latency for a CUDA kernel launch (which may be up to 50 μs) combined with the time needed to load the entire model from GPU memory are prohibitively large for an approach like this. An inference kernel in this style ends up being approximately 1000× slower than real-time.

In embodiments, to get close to real-time on a GPU, a kernel was built using the techniques of persistent RNNs (mentioned above) which generates all samples in the output audio in a single kernel launch. In embodiments, the weights for the model are loaded to registers once and then used without unloading them for the entire duration of inference. Due to the mismatch between the CUDA programming model and such persistent kernels, the resulting kernels may be specialized to particular model sizes and are incredibly labor-intensive to write. Although our GPU inference speeds are not quite real-time (Table 2), with these techniques and a more careful implementation, real-time WaveNet inference may be achieved on GPUs as well as CPUs. Implementation details for the persistent GPU kernel embodiments are available in Appendix D.

F. Some Conclusions

Herein it was demonstrated that current deep learning approaches are viable for all the components of a high-quality text-to-speech engine by building embodiments of a fully neural system. In embodiments, inference was improved to faster-than-real-time speeds, showing that these techniques can be applied to generate audio in real-time in a streaming fashion. Embodiments may be trained with a minimal or no amount of human involvement, dramatically simplifying the process of creating TTS systems.

Inference performance may be improved further through careful optimization, model quantization on GPU, and int8 quantization on CPU, as well as experimenting with other architectures such as the Xeon Phi. Another natural direction is removing the separation between stages and merging the segmentation, duration prediction, and fundamental frequency prediction models directly into the audio synthesis model, thereby turning the problem into a full sequence-to-sequence model, creating a single end-to-end trainable TTS system, and allowing training of the entire system with no intermediate supervision. In lieu of fusing the models, improving the duration and frequency models via larger training datasets or generative modeling techniques (such as adversarial training) may have an impact on voice naturalness.

The following appendices describes certain embodiments and implements are provided by way of illustration and not limitation. Other embodiments and implementation may be employed.

A. Appendix A—WaveNet Architecture Embodiments and Details

The WaveNet comprises a conditioning network c=C(v), which converts low-frequency linguistic features v to the native audio frequency, and an auto-regressive $P(y_i|c, y_{i-1}, \ldots, y_{i-R})$, which predicts the next audio sample given the conditioning for the current timestep c and a context of R audio samples. R is the receptive field size, and is a property determined by the structure of the network. A sketch of the wavenet architecture is shown in FIG. 9.

Figure 9:
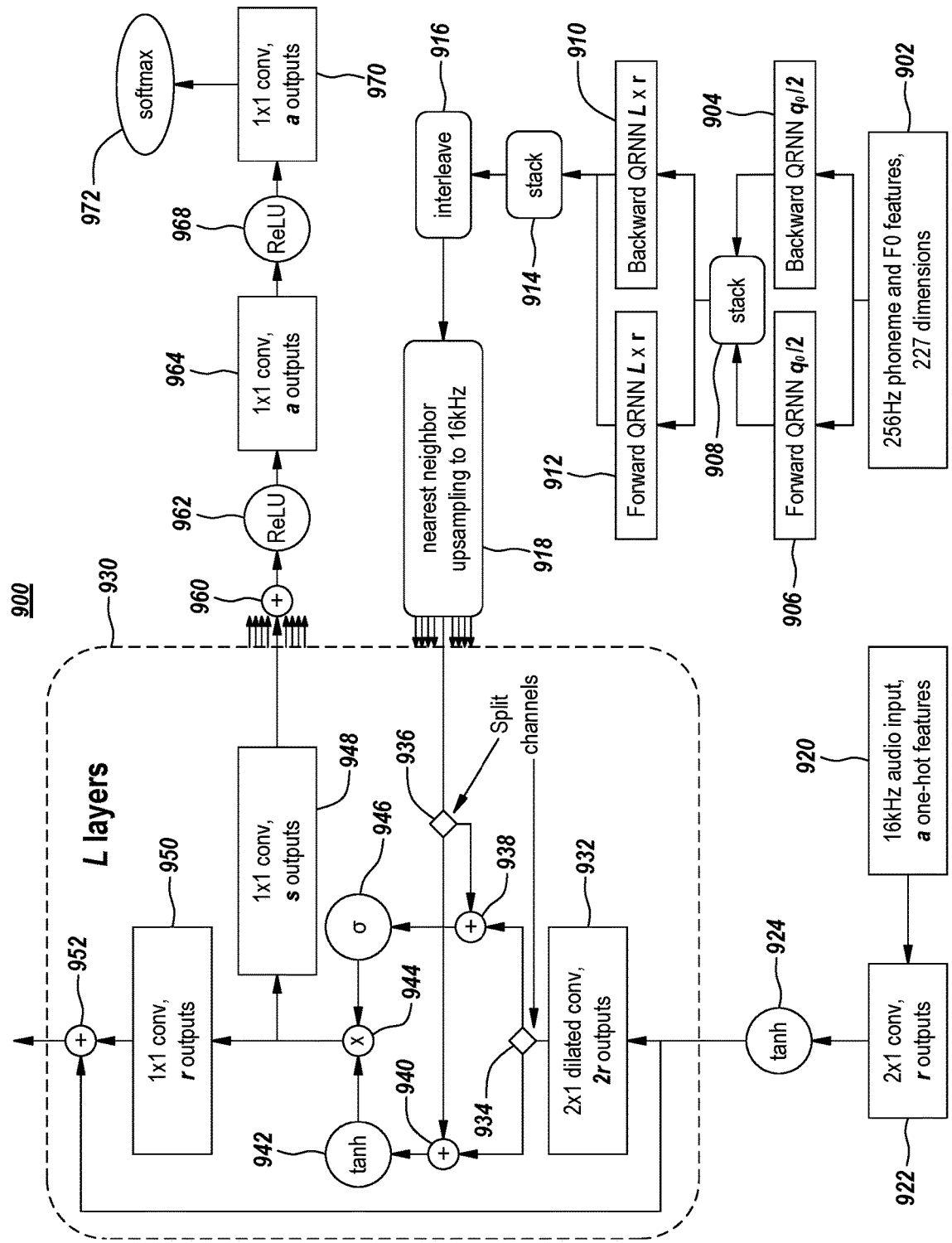
FIG. 9 depicts a modified WaveNet architecture, according to embodiments of the present document.

FIG. 9 depicts a modified WaveNet architecture, according to embodiments of the present document. In FIG. 9, components, by function, as follows: inputs are 902 and 920; convolutions and QRNNs are 904, 906, 910, 912, 922, 932, 948, 950, 964, and 970; unary operations are 924, 942, 946, 962, and 968; softmax is 972; binary operations are 938, 940, 944, 952, and 960; and reshapes, transposes, and slices are 908, 914, 916, and 918; and split channels are 934 and 936. The network details are described in the following subsections. It shall be noted that the example values (e.g., 256 Hertz, 16 Hertz, etc. are provided by way of illustration and not limitation; one skilled in the art shall recognize that these specific values are not critical).

1. Auto-Regressive WaveNet

In embodiments, the structure of the auto-regressive network is parameterized by the number of layers $\ell$, the number of skip channels s, and the number of residual channels r.

In embodiments, audio is quantized to a=256 values using μ-law companding, as described in Section 2.2 of WaveNet. The one-hot encoded values go through an initial 2×1 convolution which generates the input $x^{(0)} \in \mathbb{R}^r$ for the first layer in the residual stack:

$$x^{(0)} = W_{embed} * y + B_{embed} \tag{11}$$

where * is the one-dimensional convolution operator.

Since the input audio y is a one-hot vector, this convolution may be done via embeddings instead of matrix multiplies. In embodiments, each subsequent layer computes a hidden state vector $h^{(i)}$ and then (due to the residual connections between layers) adds to its input $x^{(i-1)}$ to generate its output $x^{(i)}$:

$$h^{(i)} = \tan h(W_h^{(i)} * x^{(i-1)} + B_h^{(i)} + L_h^{(i)}) \cdot \sigma(W_g^{(i)} * x^{(i-1)} + B_g^{(i)} + L_g^{(i)}) \tag{12}$$

$$x^{(i)} = x^{(i-1)} + W_r^{(i)} \cdot h^{(i)} + B_r^{(i)}, \tag{13}$$

where $L^{(i)}$ is the output for that layer of the conditioning network. Since each layer adds its output to its input, the dimensionality of the layers must remain fixed to the number of residual channels, r. Although here this is written as two convolutions, one for $W_h$ and one for $W_g$, it is actually done more efficiently with a single convolution with r input and 2r output channels. In embodiments, during inference, this convolution is replaced with two matrix-vector multiplies with matrices $W_{prev}$ (the left half of the convolution) and $W_{cur}$ (the right half). Thus, the computation of $h^{(i)}$ for a specific timestep t may be reformulated as follows:

$$h'^{(i)} = W_{prev}^{(i)} \cdot x_{t-d}^{(i-1)} + W_{cur}^{(i)} \cdot x_t^{(i-1)} + B^{(i)} + L^{(i)} \tag{14}$$

$$h^{(i)} = \tan h(h'_{0:r}^{(i)}) \cdot \sigma(h'_{r:2r}^{(i)}) \tag{15}$$

where $L^{(i)}$ is a concatenation of $L_h^{(i)}$ and $L_g^{(i)}$ and $B^{(i)}$ is a concatenation of $B_h^{(i)}$ and $B_g^{(i)}$.

The hidden state $h^{(i)}$ from each of the layers 1 through $\ell$ is concatenated and projected with a learned $W_{skip}$ down to the number of skip channels s:

$$h = \begin{bmatrix} h^{(1)} \\ h^{(2)} \\ \vdots \\ h^{(\ell)} \end{bmatrix} \quad h \in \mathbb{R}^{\ell r} \tag{16}$$

$$z_s = \text{relu}(W_{skip} \cdot h + B_{skip}), z_s \in \ell^s \tag{17}$$

where relu(x)=max(0,x).

$z_s$ is then fed through two fully connected relu layers to generate the output distribution $p \in \ell^a$:

$$z_a = \text{relu}(W_{relu} \cdot z_s + B_{relu}), z_a \in \ell^a \tag{18}$$

$$p = \text{softmax}(W_{out} \cdot z_a + B_{out}) \tag{19}$$

2. Conditioning Network

When trained without conditioning information, WaveNet models produce human-like "babbling sounds," as they lack sufficient long-range information to reproduce words. In embodiments, in order to generate recognizable speech, every timestep is conditioned by an associated set of linguistic features. This may be done by biasing every layer with a per-timestep conditioning vector generated from a lower-frequency input signal containing phoneme, stress, and fundamental frequency features.

The frequency of the audio is significantly higher than the frequency of the linguistic conditioning information, so an upsampling procedure is used to convert from lower-frequency linguistic features to higher-frequency conditioning vectors for each WaveNet layer.

The original WaveNet does upsampling done by repetition or through a transposed convolution. Instead, we first pass our input features through two bidirectional quasi-RNN layers with fo-pooling (i.e., pooling of forget and output gates) and 2×1 convolutions. A unidirectional QRNN layer with fo-pooling is defined by the following equations:

$$\tilde{h} = \tan h(W_h * x + B_h) \tag{20}$$

$$o = \sigma(W_o * x + B_o) \tag{21}$$

$$f = \sigma(W_f * x + B_f) \tag{22}$$

$$h_t = f_t \cdot h_{t-1} + (1 - f_t) \cdot \tilde{h}_t \tag{23}$$

$$z_t = o_t \cdot h_t \tag{24}$$

In embodiments, a bidirectional QRNN layer is computed by running two unidirectional QRNNs, one on the input sequence and one on a reversed copy of the input sequence, and then stacking their output channels. After both QRNN layers, the channels are interleaved, so that the tan h and the sigmoid in the WaveNet both get channels generated by the forward QRNN and backward QRNN.

Following the bidirectional QRNN layers, upsampling to the native audio frequency by repetition is performed. (In embodiments, upsampling using bilinear interpolation slowed convergence and reduced generation quality by adding noise or causing mispronunciations, while bi-cubic upsampling led to muffled sounds. Upsampling by repetition is done by computing the ratio of the output frequency to the input frequency and repeating every element in the input signal an appropriate number of times).

It was found that embodiments of the model may be sensitive to the upsampling procedure: although many variations of the conditioning network converge, they can produce some phoneme mispronunciations.

3. Input Featurization

Tested WaveNet embodiments of the current patent document were trained with 8-bit μ-law companded audio which is downsampled to 16384 Hz from 16-bit dual-channel Pulse-Code Modulation (PCM) audio at 48000 Hz. It was conditioned on a 256 Hz phoneme signal. In depicted embodiment, the conditioning feature vector has 227 dimensions. Of these, two are for fundamental frequency. One of these indicates whether the current phoneme is voiced (and thus has an F0) and the other is normalized log-frequency, computed by normalizing the log of F0 to minimum observed F0 to be approximately between −1 and 1. The rest of the features describe the current phoneme, the two previous phonemes, and the two next phonemes, with each phoneme being encoded via a 40-dimensional one-hot vector for phoneme identity (with 39 phonemes for ARPABET phonemes and 1 for silence) and a 5-dimensional one-hot vector for phoneme stress (no stress, primary stress, secondary stress, tertiary stress, and quaternary stress). Not all of the datasets have tertiary or quaternary stress, and those features are always zero for the datasets that do not have those stress levels.

In experiments, it was found that including the phoneme context (two previous and two next phonemes) was beneficial for upsampling via transposed convolution and less critical but still important for our QRNN-based upsampling embodiments. Although sound quality without the phoneme context remains high, mispronunciation of a subset of the utterances may become an issue. It was also found that including extra prosody features such as word and syllable breaks, pauses, phoneme and syllable counts, frame position relative to phoneme, etc., were unhelpful and did not result in higher quality synthesized samples.

To convert from phonemes annotated with durations to a fixed-frequency phoneme signal, the phonemes were sampled at regular intervals, effectively repeating each phoneme (with context and F0) a number proportional to its duration. As a result, phoneme duration is effectively quantized to 1/256 sec≈4 ms.

Praat, a free computer software package for the scientific analysis of speech in phoneticsm which was designed and developed by Paul Boersma and David Weenink of the Institute of Phonetic Sciences—University of Amsterdam, was used in batch mode to compute F0 at the appropriate frequency, with a minimum F0 of 75 and a maximum F0 of 500.

4. Sampling from Output Distribution

In embodiments, at every timestep, the synthesis model produces a distribution over samples, P(s), conditioned on the previous samples and the linguistic features. To produce the samples, there are a variety of ways one may choose to use this distribution:

Direct Sampling: Sample randomly from P(y).

Temperature Sampling: Sample randomly from a distribution adjusted by a temperature t $$\tilde{P}_t(y) = \frac{1}{Z} P(y)^{1/t}, \quad (25)$$

where Z is a normalizing constant.

Mean: Take the mean of the distribution $E_P[y]$.

Mode: Take the most likely sample, argmax P(y).

Top k: Sample from an adjusted distribution that only permits the top k samples $$\tilde{P}_k(y) = \begin{cases} 0 & \text{if } y < kth(P(y)) \\ P(y)/Z & \text{otherwise,} \end{cases} \quad (26)$$

where Z is a normalizing constant.

It was found that out of these different sampling methods, direct sampling produces high quality outputs. Temperature sampling produces acceptable quality results, and indeed outperforms direct sampling early on in training, but for converged models is significantly worse. This observation indicates that the generative audio model accurately learns a conditional sample distribution and that modifying this distribution through the above heuristics is worse than just using the learned distribution.

5. Training

Several tendencies of the models were observed during training. As expected, the randomly initialized model produces white noise. Throughout training, the model gradually increases the signal to noise ratio, and the volume of the white noise dies down while the volume of the speech signal increases. The speech signal can be inaudible for tens of thousands of iterations before it dominates the white noise.

In addition, because the model is autoregressive, rare mistakes can produce very audible disturbances. For example, a common failure mode is to produce a small number of incorrect samples during sampling, which then results in a large number incorrect samples due to compounding errors. This is audible as a brief period of loud noise before the model stabilizes. The likelihood of this happening is higher early on in training, and does not happen in converged models

B. Appendix B—Phoneme Model Loss

In embodiments, the loss for the $n^{th}$ phoneme is $$L_n = |\hat{t}_n - t_n| + \lambda_1 CE(\hat{p}_n, p_n) + \lambda_2 \Sigma_{t=0}^{T-1} |\widehat{F0}_{n,t} - F0_{n,t}| + \lambda_3 \Sigma_{t=0}^{T-2} |\widehat{F0}_{n,t+1} - \widehat{F0}_{n,t}|, \quad (27)$$

where $\lambda_i$'s are tradeoff constants, $\hat{t}_n$ and $t_n$ are the estimated and ground-truth durations of the $n^{th}$ phoneme, $\hat{p}_n$ and $p_n$ are the estimated and ground-truth probabilities that the $n^{th}$ phoneme is voiced, CE is the cross-entropy function, $\widehat{F0}_{n,t}$ and $F0_{n,t}$ are the estimated and ground-truth values of the fundamental frequency of the $n^{th}$ phoneme at time t. In embodiments, T time samples are equally spaced along the phoneme duration.

C. Appendix C—Nonlinearity Approximation Details

During inference, in embodiments, exact implementations of the neural network nonlinearities were replaced with high-accuracy rational approximations. In this appendix, the derivation of these approximations is detailed.

1. tan h and Sigmoid Approximation

Denoting $\tilde{e}(x)$ as an approximation to $e^{|x|}$, the following approximations for tan h and $\sigma$ are used:

$$\tanh(x) \approx \text{sign}(x)\frac{\tilde{e}(x) - 1/\tilde{e}(x)}{\tilde{e}(x) + 1/\tilde{e}(x)} \quad (28)$$

$$\sigma(x) \approx \begin{cases} \frac{\tilde{e}(x)}{1+\tilde{e}(x)} & x \geq 0 \\ \frac{1}{1+\tilde{e}(x)} & x \leq 0 \end{cases} \quad (29)$$

A fourth-order polynomial was chosen to represent $\tilde{e}(x)$. The following fit produces accurate values for both tan h(x) and $\sigma(x)$:

$$\tilde{e}(x)=1+|x|+0.5658x^2+0.143x^4 \quad (30)$$

By itself, $\tilde{e}(x)$ is not a very good approximate function for $e^{|x|}$, but it yields good approximations when used to approximate tan h and $\sigma$ as described in Equations 28 and 29.

2. $e^x$ Approximation

In embodiments, instead of approximating $e^x$ directly, $2^x$ was approximated and the identity $e^x = 2^{x/\ln 2}$ was used.
Let $\lfloor x \rfloor$ to be the floor of $x \in \ell$. Then, $$2^x = 2^{\lfloor x \rfloor} \cdot 2^{x-\lfloor x \rfloor}$$
$$= 2^{\lfloor x \rfloor} \cdot \left(1 + \left(2^{x-\lfloor x \rfloor} - 1\right)\right)$$

where $0 \leq 2^{x-\lfloor x \rfloor} - 1 < 1$ since $0 \leq x - \lfloor x \rfloor < 1$. If using a 32-bit float to represent $2^x$, then $\lfloor x \rfloor + 127$ and $2^{x-\lfloor x \rfloor} - 1$ may be represented by the exponent and fraction bits of $2^x$. Therefore, if the bytes pattern of $2^x$ is interpreted as a 32-bits integer (represented by $I_{2^x}$), it yields:

$$I_{2^x} = (\lfloor x \rfloor + 127) \cdot 2^{23} + (2^{x-\lfloor x \rfloor} - 1) \cdot 2^{23}. \quad (31)$$

Rearranging Equation 31 and using $z = x - \lfloor x \rfloor$ results to:

$$I_{2^x} = (x+126+\{2^z-z\}) \cdot 2^{23} \quad (32)$$

If $g(z) = 2^z - z$ can be accurately approximated over $z \in [0, 1)$, then interpreting back the byte representation of $I_{2^x}$ in Equation 32 as a 32-bits float, $2^x$ can be accurately approximated. A rational approximation may be used as:

$$g(z) \approx -4.7259162 + \frac{27.7280233}{4.84252568 - z} - 1.490129072z, \quad (33)$$

which gives are maximum error $2.4 \times 10^{-5}$ for $x \in (-\infty, 0]$.

D. Appendix D—Persistent GPU Kernels

An NVIDIA GPU has multiple Streaming Multiprocessors (SMs), each of which has a register file and a L1 cache. There is also a coherent L2 cache that is shared by all SMs. The inference process needs to generate one sample every 61 µs. Due to the high latency of a CUDA kernel launch and of reading small matrices from GPU memory, the entire audio generation process must be done by a single kernel with the weights loaded into the register file across all SMs. This raises two challenges—how to split the model across registers in a way to minimize communication between SMs and how to communicate between SMs given the restrictions imposed by the CUDA programming model.

In embodiments, the model may be split across the register file of 24 SMs, numbered SM1·SM24, of a TitanX GPU. In embodiments, SM24 was not used. In embodiments, SM1 to SM20 store two adjacent layers of the residual stack. This means SM1 stores layers 1 and 2, SM2 stores layers 3 and 4 and so on and so forth. Each layer has three matrices and three bias vectors—$W_{prev}$, $B_{prev}$, $W_{cur}$, $B_{cur}$, that are for the dilated convolutions and $W_r$, $B_r$. Thus SMi generates two hidden states $h^{(2i)}$ and $h^{(2i+1)}$ and an output $x^{(2i)}$. Each SM also stores the rows of the $W_{skip}$ matrix that will interact with the generated hidden state vectors. Thus $W_{skip}$ is partitioned across 20 SMs. In embodiments, only SM20 needs to store $B_{skip}$. SM21 stores $W_{relu}$ and $B_{relu}$. Finally, $W_{out}$ is split across two SMs—SM22 and SM23 because of register file limitations and SM23 stores $B_{out}$.

The next challenge is to coordinate the data transfer between SMs, since the CUDA programming model executes one kernel across all SMs in parallel. However, execution is wanted to go sequentially in a round robin fashion from SM1 to SM23 and back again from SM1 as one audio sample is generated at a time. We launch our CUDA kernel with 23 thread blocks and simulate such sequential execution by spinning on locks, one for each SM, that are stored in global memory and cached in L2. First, SM1 executes two layers of the WaveNet model to generate $h^{(1)}$, $h^{(2)}$ and $x^{(2)}$. It then unlocks the lock that SM2 is spinning on and sets its own lock. It does this by bypassing the L1 cache to write to global memory so that all SMs have a coherent view of the locks. Then, SM2 does the same for SM3 and this sequential locking and unlocking chain continues for each SM. Finally, SM23 generates the output distribution p for timestep t and unlocks SM1 so that entire process can repeat to generate p for timestep t+1.

Just like locks, data is passed between SMs, by reading and writing to global memory by bypassing the L1 cache. Since NVIDIA GPUs have a coherent L2 cache, a global memory write bypassing the L1, followed by a memory fence results in a coherent view of memory across SMs.

This partitioning scheme however is quite inflexible and only works for specific values of l, r, and s shown in Table 2. This is because each SM has a fixed sized register file and combined with the relatively inflexible and expensive communication mechanism between SMs implies that splitting weight matrices between SMs is challenging. Any change in those parameters means a new kernel has to be written, which is a very time-consuming process.

There are two main reasons why the GPU kernels are slower than CPU kernels. Firstly, synchronization between SMs in a GPU is expensive since it is done by busy waiting on locks in L2 cache. Secondly even though the model was divided in a way that will fit in the register file of each SM, the CUDA compiler still spills to L1 cache. With hand-crafted assembly code, the performance of CPU kernels should be able to be matched. However, the lack of parallelism in WaveNet inference makes it difficult to hide the latencies inherent in reading and writing small matrices from GPU memory which are exposed in the absence of a rich cache hierarchy in GPUs.

E. Appendix E—Performance Model

Embodiments of a performance model for the autoregressive WaveNet architecture described in Appendix Section A.1 are presented herein. In a model embodiment, a dot product between two vectors of dimension r takes 2r FLOPS—r multiplications and r additions. This means that a matrix-vector multiply between W, an r×r matrix and x, a r×1 vector takes 2r×r=2r² FLOPs. Thus, calculating $h'^{(i)}$ uses the following FLOPs:

$$\text{Cos } t(h'^{(i)}) = (2r \cdot 2r) + (2r \cdot 2r) + 2r + 2r + 2r \text{ FLOPs} \quad (34)$$

Let division and exponentiation take $f_d$ and $f_e$ FLOPs, respectively. This means tan h and σ takes $(f_d+2f_e+1)$ FLOPs. Thus, calculating $h^{(i)}$ takes $2r \cdot (f_d+2f_e+1)+r$ FLOPs. Finally, calculating $x^{(i)}$ for each layer takes $r+(2r \cdot r)+r$ FLOPs. This brings the total FLOPs for calculating one layer to:

$$\text{Cos } t(\text{layer}) = 10r^2 + 11r + 2r(f_d+f_e) \text{FLOPs} \quad (35)$$

Under the same model, calculating $z_s$ takes $(\ell \cdot 2r) \cdot s+s+s$ FLOPs, where it is assumed that relu takes 1 FLOP. Similarly, calculating $z_a$ takes $2 s \cdot a+a+a$ FLOPs and $W_{out} \cdot z_a+B_{out}$ takes $2a \cdot a+a$ FLOPs.

Calculating the numerically stable softmax takes one max, one subtract, one exponentiation, one sum, and one division per element of a vector. Hence calculating p takes $3a+a(f_d+f_e)$ FLOPs.

Adding it all up, an embodiment of a final performance model embodiment to generate each audio sample is as follows:

$$\text{Cos } t(\text{sample}) = \ell (10r^2 + 11r + 2r(f_d+f_e)) + s(2r \cdot \ell + 2) + a(2s+2a+3) + a(3+f_d+f_e) \text{FLOPS} \quad (36)$$

Letting $\ell=40$, $r=64$, and $s=a=256$, and assuming that $f_d=10$ and $f_e=10$, with a sampling frequency of 16384 Hz, approximately $55 \times 10^9$ FLOPs occur for every second of synthesis.

F. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 10:
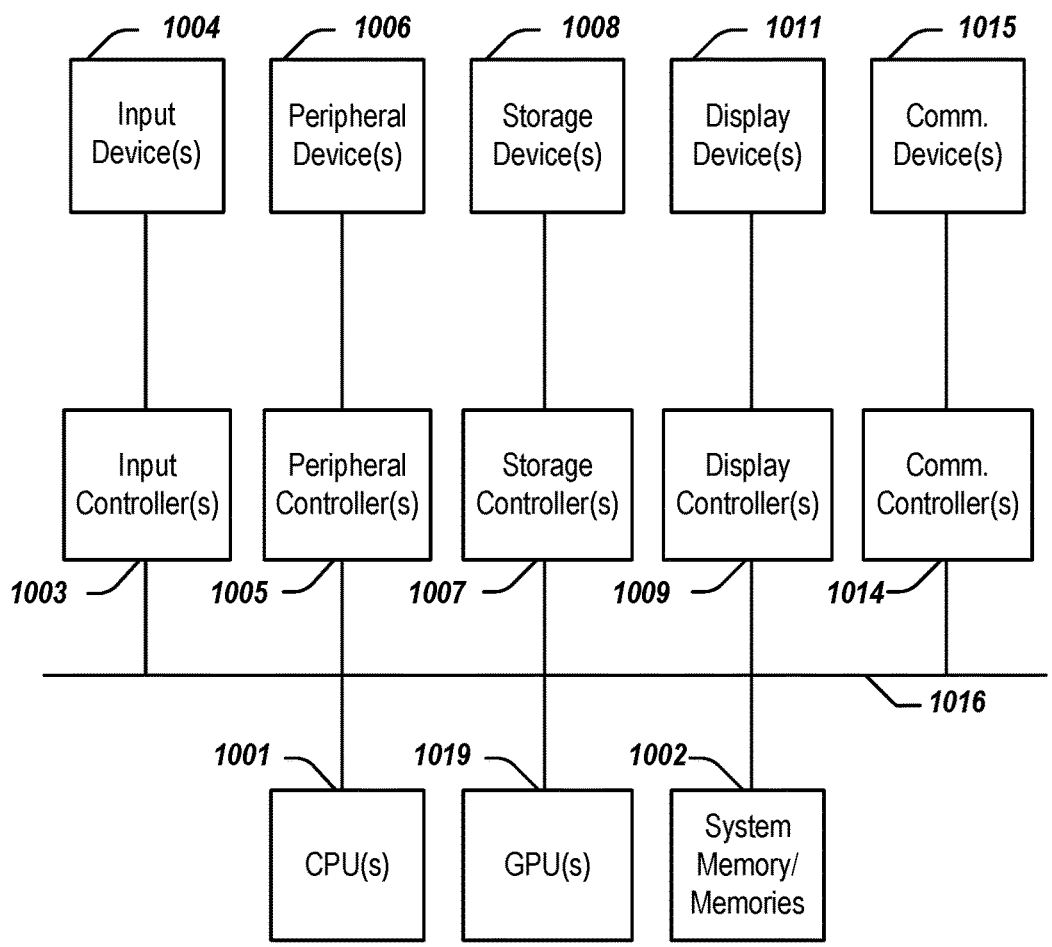
FIG. 10 depicts a simplified block diagram of a computing device/information handling system, in accordance with embodiments of the present document.

FIG. 10 depicts a simplified block diagram of a computing device/information handling system (or computing system) according to embodiments of the present disclosure. It will be understood that the functionalities shown for system 1000 may operate to support various embodiments of a computing system—although it shall be understood that a computing system may be differently configured and include different components, including having fewer or more components than depicted in FIG. 10.

As illustrated in FIG. 10, the computing system 1000 includes one or more central processing units (CPU) 1001 that provides computing resources and controls the computer. CPU 1001 may be implemented with a microprocessor or the like, and may also include one or more graphics processing units (GPU) 1017 and/or a floating-point coprocessor for mathematical computations. The system 1000 may also include a system memory 1002, which may be in the form of random-access memory (RAM), read-only memory (ROM), or both.

A number of controllers and peripheral devices may also be provided, as shown in FIG. 10. An input controller 1003 represents an interface to various input device(s) 1004, such as a keyboard, mouse, touchscreen, and/or stylus. There may also be a scanner controller 1005, which communicates with a scanner 1006. System 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), a thin film transistor (TFT) display, organic light-emitting diode, electroluminescent panel, plasma panel, or other type of display. The computing system 1000 may also include may also include one or more peripheral controllers or interfaces 1005 for one or more peripherals 1006. Examples of peripherals may include one or more printers, scanners, input devices, output devices, sensors, and the like. A communications controller 1014 may interface with one or more communication devices 1015, which enables system 1000 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of embodiments may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of the claims may be arranged differently including having multiple dependencies, configurations, and combinations.

What is claimed is:

1. A computer-implemented method for using a text-to-speech (TTS) system to synthesize human speech from text, comprising:
    using a trained grapheme-to-phoneme model to convert written text to phonemes corresponding to the written text;
    inputting the phonemes into either: (1) a trained phoneme duration and fundamental frequency model or (2) a trained phoneme duration model and a trained fundamental frequency model, to output for a phoneme:
       a phoneme duration;
       a probability that the phoneme is voiced; and
       a fundamental frequency profile; and
    using a trained neural network audio synthesis model that receives the phonemes, the phoneme durations, the fundamental frequency profiles for the phonemes, and for each phoneme, a probability whether the phoneme is voiced as an input to generate a signal representing synthesized human speech of the written text.

2. The computer-implemented method of claim 1 wherein the step of using a trained grapheme-to-phoneme model to convert written text to phonemes corresponding to the written text comprises:
    using, for one or more words in the written text, a phoneme dictionary look-up to convert the one or more words to phonemes.

3. The computer-implemented method of claim 1 further comprising utilizing one or more computational efficiencies to help the text-to-speech system produce the signal representing synthesized human speech of the written text in real-time or faster than real-time.

4. The computer-implemented method of claim 3 wherein one of the one or more computation efficiencies comprises the trained neural network audio synthesis model using multiple threads and overlapping computation on those threads to produce the signal representing synthesized human speech.

5. The computer-implemented method of claim 1 wherein the fundamental frequency profile for a phoneme is a set of fundamental frequencies values equally spaced in a time domain across the phoneme duration for the phoneme.

6. The computer-implemented method of claim 1 wherein the phoneme represent phoneme with stresses, when applicable to the phoneme.

7. The computer-implemented method of claim 6 wherein the trained neural network audio synthesis model comprises a conditioner network for biasing every layer with a per-timestep conditioning vector generated from a lower-frequency input signal comprising features obtained at least from the phonemes, including phoneme stresses, and the fundamental frequency profiles.

8. A non-transitory computer-readable medium or media comprising one or more sequences of instructions which, when executed by at least one processor, causes steps for synthesizing human speech from text, comprising:
    converting written text to a set of phonemes corresponding to the written text using a trained grapheme-to-phoneme model;
    using either: (1) a trained phoneme duration and fundamental frequency model, or (2) a trained phoneme duration model and a trained fundamental frequency model, to obtain for each phoneme from the set of the phonemes:
a phoneme duration;
a probability that the phoneme is voiced; and
a fundamental frequency profile; and
generating a signal representing synthesized human speech of the written text using a trained neural network audio synthesis model that receives the set of phonemes, the phoneme durations, the fundamental frequency profiles, and the probabilities whether the phonemes are voiced.

9. The non-transitory computer-readable medium or media of claim 8 wherein the step of converting convert written text to a set of phonemes corresponding to the written text using a trained grapheme-to-phoneme model comprises:
using, for one or more words in the written text, a phoneme dictionary look-up to convert the one or more words to phonemes.

10. The non-transitory computer-readable medium or media of claim 8 further comprising one or more sequences of instructions which, when executed by at least one processor, causes one or more steps comprising:
employing one or more computational efficiencies to produce the signal representing synthesized human speech of the written text in real-time or faster than real-time.

11. The non-transitory computer-readable medium or media of claim 10 wherein one of the one or more computation efficiencies comprises the trained neural network audio synthesis model using multiple threads and overlapping computation on those threads to produce the signal representing synthesized human speech.

12. The non-transitory computer-readable medium or media of claim 8 wherein the phoneme represent phoneme with stresses, when applicable to the phoneme.

13. The non-transitory computer-readable medium or media of claim 12 wherein the trained neural network audio synthesis model comprises a conditioner network for one or more layers with a per-timestep conditioning vector generated from a lower-frequency input signal comprising features obtained at least from the phonemes, including phoneme stresses, and the fundamental frequency profiles.

14. A system comprising:
one or more processors; and
a non-transitory computer-readable medium or media comprising one or more sets of instructions which, when executed by at least one of the one or more processors, causes steps to be performed comprising:
using a trained grapheme-to-phoneme model to convert written text to phonemes corresponding to the written text;
inputting the phonemes into either: (1) a trained phoneme duration and fundamental frequency model or (2) a trained phoneme duration model and a trained fundamental frequency model, to output for a phoneme:
a phoneme duration;
a probability that the phoneme is voiced; and
a fundamental frequency profile; and
using a trained neural network audio synthesis model that receives the phonemes, the phoneme durations, the fundamental frequency profiles for the phonemes, and for each phoneme, a probability whether the phoneme is voiced as an input to generate a signal representing synthesized human speech of the written text.

15. The system of claim 14 wherein the step of using a trained grapheme-to-phoneme model to convert written text to phonemes corresponding to the written text comprises:
using, for one or more words in the written text, a phoneme dictionary look-up to convert the one or more words to phonemes.

16. The system of claim 14 further comprising utilizing one or more computational efficiencies to help the system produce the signal representing synthesized human speech of the written text in real-time or faster than real-time.

17. The system of claim 16 wherein one of the one or more computation efficiencies comprises the trained neural network audio synthesis model using multiple threads and overlapping computation on those threads to produce the signal representing synthesized human speech.

18. The system of claim 14 wherein the fundamental frequency profile for a phoneme is a set of fundamental frequencies values equally spaced in a time domain across the phoneme duration for the phoneme.

19. The system of claim 14 wherein the phoneme represent phoneme with stresses, when applicable to the phoneme.

20. The system of claim 19 wherein the trained neural network audio synthesis model comprises a conditioner network for biasing every layer with a per-timestep conditioning vector generated from a lower-frequency input signal comprising features obtained at least from the phonemes, including phoneme stresses, and the fundamental frequency profiles.

* * * * *